(12) United States Patent
Buck

(10) Patent No.: US 11,916,969 B2
(45) Date of Patent: *Feb. 27, 2024

(54) PRIVACY PRESERVATION IN NETWORK CONNECTIONS

(71) Applicant: LOOKOUT, INC., Boston, MA (US)

(72) Inventor: Brian James Buck, Livermore, CA (US)

(73) Assignee: LOOKOUT, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,898

(22) Filed: Jul. 14, 2023

(65) Prior Publication Data
US 2023/0362204 A1 Nov. 9, 2023

Related U.S. Application Data

(63) Continuation of application No. 18/058,446, filed on Nov. 23, 2022, now Pat. No. 11,765,206, which is a continuation of application No. 17/178,669, filed on Feb. 18, 2021, now abandoned.

(60) Provisional application No. 62/978,780, filed on Feb. 19, 2020.

(51) Int. Cl.
*H04L 9/40* (2022.01)
*G06F 16/28* (2019.01)
*H04L 61/4511* (2022.01)
*G06T 7/73* (2017.01)

(52) U.S. Cl.
CPC ............ *H04L 63/20* (2013.01); *G06F 16/285* (2019.01); *G06T 7/74* (2017.01); *H04L 61/4511* (2022.05); *H04L 63/04* (2013.01); *H04L 63/1425* (2013.01)

(58) Field of Classification Search
CPC ..... H04L 63/20; H04L 61/4511; H04L 63/04; H04L 63/1425; G06F 16/285; G06T 7/74
See application file for complete search history.

(56) References Cited

U.S. PATENT DOCUMENTS

2017/0206691 A1* 7/2017 Harrises ............. G02B 27/0172
2020/0098179 A1* 3/2020 Gough ................... G09G 5/377
2020/0143584 A1* 5/2020 Noris ....................... G06T 19/20

* cited by examiner

*Primary Examiner* — Umair Ahsan
(74) *Attorney, Agent, or Firm* — Dergosits & Noah LLP

(57) ABSTRACT

Methods and systems provide for reducing privacy leaks in DNS request by using a private DNS service. The private DNS service provides for matching a level of privacy provided by a type of communication protocol to a level of privacy desired or required for a particular client communication. When the DNS service determines that an intended communication protocol does not supply at least the level of privacy desired for a particular communication, the private DNS service may initiate the creation of a connection with the desired level of privacy.

38 Claims, 8 Drawing Sheets

PRIVACY PRESERVATION IN NETWORK CONNECTIONS

CROSS REFERENCE TO RELATED CASES

This continuation application claims priority to U.S. patent application Ser. No. 18/058,446 entitled "PRIVACY PRESERVATION IN NETWORK CONNECTIONS," filed Nov. 23, 2022, which is a continuation of U.S. patent application Ser. No. 17/178,669 entitled "PRIVACY PRESERVATION IN NETWORK CONNECTIONS," filed Feb. 18, 2021, which claims priority to U.S. Provisional Patent Application No. 62/978,780, entitled "PRIVACY PRESERVATION IN NETWORK CONNECTIONS," filed Feb. 19, 2020, which is incorporated by reference in its entirety.

TECHNICAL FIELD

The claimed subject matter relates generally to the field of network communications and more specifically to enhancing network security while processing DNS requests.

BACKGROUND

Privacy is increasingly a concern not just for users but also for enterprises. But there are many types of privacy leaks, such as: privacy leaks through DNS; privacy leaks through connections being HTTP instead of HTTPS; privacy leaks through TLS SNI (Server Name Indication) being sent during a TLS handshake in cleartext instead of being encrypted (ESNI); and traffic analysis by observing an IP address used in a connection.

For example, FIG. 1 is a prior art handshake protocol for TLS 1.2. In FIG. 1, server 10 may be part of a cloud distribution network that handles multiple domain names. Server 10 needs to know which domain is to be resolved, so it can select the correct certificate for responding to the TLS handshake. For that reason, when client 12 sends hello 1, the communication of the SNI is in cleartext. It's not until client key exchange 3 that the rest of the conversation is encrypted. Privacy leaks may occur when DNS requests are sent in clear text. Essentially, the cleartext includes the domain name of every site visited. Any actor able to see the communication can determine the sites a user visits, e.g.: a Wi-Fi sniffer, man-in-the-middle, known DNS provider, or ISP. Encrypted SNI (or ESNI) exists, but may in the future be referred to as Encrypted Client Hello (ECH). This disclosure may reference either.

Also, different applications or services may have different requirements for privacy. For example, a user or enterprise may not care about privacy leaks involving youtube.com. In contrast, privacy leaks regarding enterprise services would normally be something an enterprise wished to prevent. Some privacy mechanisms use more device or infrastructure resources than others. Thus, for resource-intensive mechanisms, it would be preferable to use such resources only when necessary. That is, it would be desirable to have a solution that can upgrade to the appropriate privacy preservation mechanisms as needed or desired, but not where an upgrade is not necessary or undesired.

Also regarding network communication, in the future, 5G connectivity may include the ability to have Device-to-Device (D2D) communications, either directly with both devices as endpoints, or in a D2D relaying mode, in which an intermediate device relays a connection from a first device (that may not have a good connection to 5G cellular infrastructure) to the 5G infrastructure (to which the intermediate device does have a good connection). The scenarios for such relaying include: public safety in emergency conditions where cellular infrastructure may have been damaged or is offline; direct to talk non-public safety scenarios; D2D relaying to extend the range of connectivity of 5G using intermediate devices; and to otherwise expand coverage. D2D relaying may also exist in networks other than 5G networks, such as a use of Bluetooth relaying.

However, particularly in non-public safety scenarios, for a user of a device, or an enterprise whose employees/contractors are using such devices, the use of the user's or enterprises' device for D2D relaying my consume device resources, such as device battery. This can be undesirable for a variety of reasons, including reducing the ability of the user at a later time to use the device because the battery has been drained. Additionally, a device might be frequently used for D2D relaying while seldom gaining any benefit from D2D relaying by other devices. This can be unfair and perhaps not desired. Thus, it would be desirable for users or enterprises to be able to specify policies regarding acceptable uses of D2D relaying by devices.

Further regarding mobile devices that may be used to view different types of alternate realities (e.g., virtual reality (VR), extended reality (ER), or augmented reality (AR), or anywhere in the continuum of extended reality (XR)), applications that allow the user to experience actual reality with added virtual, augmented, or otherwise computer-generated features (which may include both video and audio features) may conceal certain real features or distract the user from noticing certain real features.

In such XR, a user may view the physical world with added ("augmented") imagery generated by a computer and overlaid onto the viewer's field of view. Currently, this is often accomplished by looking "through" a mobile device, where the display shows the view from the back-facing camera overlaid with virtual or augmented imagery. The imagery may be generated by the mobile device, or may be supplied by an AR content server. In the future, this may be done by a true "look through" type or "head's up display" using wearable glasses or another head-mounted device (HMD). In all these cases, the AR content may be scaled and rotated so as to appear to be in the "real world" (RW), even though it is in fact in the "augmented world" (AW).

In this way, XR applications and devices bridge the cyber world and the physical world. But the real world may present real danger to the user. And a bad user interface design on such devices is no longer just a nuisance, but rather something that can threaten the user's safety in the real world. Thus, it would be desirable for users if a systems and methods existed for alerting a user of an augmented reality device in certain situations to pay attention to their surroundings.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

Section 1
Privacy Preservation in Network Connections and Performance Enhancements In embodiments, privacy leaks can be reduced or avoided by using Private DNS (or "encrypted DNS"). With such embodiments, the client still must trust the DNS provider, but the rest of the associated privacy leaks are eliminated.

In embodiments, the use of Private DNS is enhanced by matching a level of privacy provided by a type of communication protocol to a level of privacy desired or required for the client communication, i.e., the solution pairs a connection protocol with a certain level of privacy to a communication based on a level of concern regarding the communication.

Figure 1:
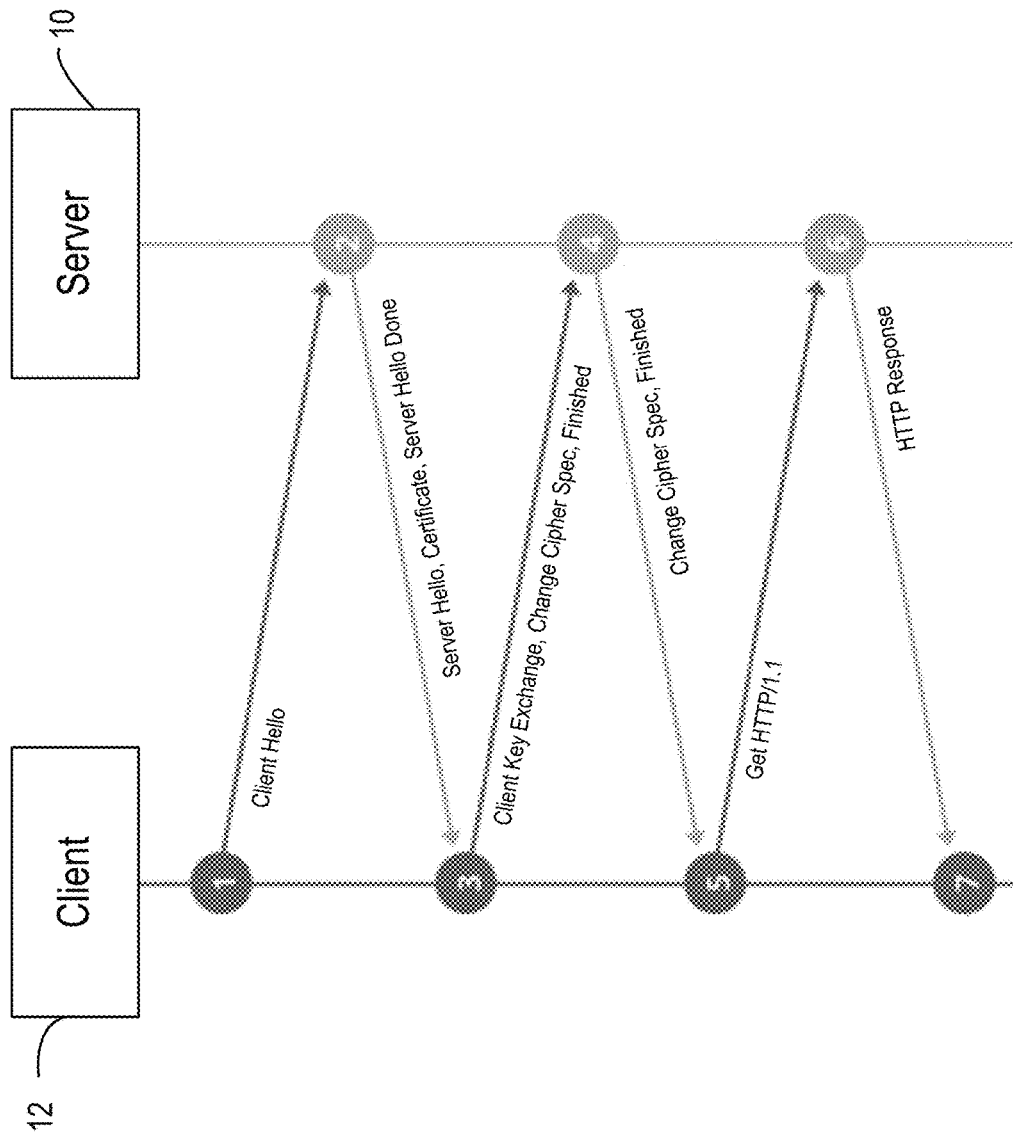
FIG. 1 is a schematic of a Prior Art flow TLS handshake.
Figure 2:
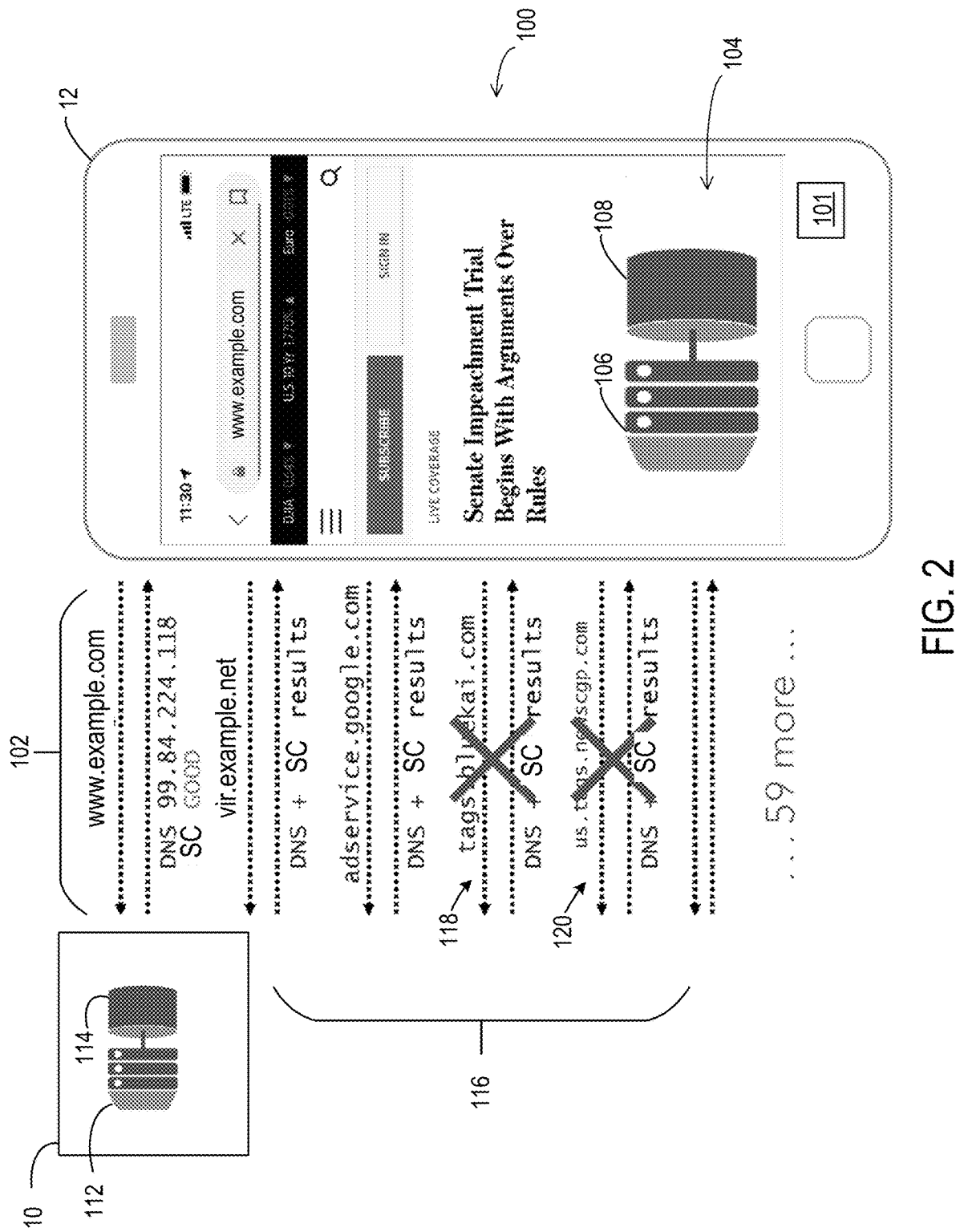
FIG. 2 is a diagram of an embodiment of a system for processing DNS requests.

FIG. 2 is a diagram of embodiments of a mechanisms and methods for processing DNS requests that increase privacy. In FIG. 2, server 10 and client 12 exchange network traffic 102. In an embodiment, an agent 104 on client 12 may include a security software component 106 and a private DNS component 108. Similarly, in an embodiment, server 10 may include a module 110 including a security software component 112 and a private DNS component 114. Additionally, in an embodiment, client 12 may include agent 104 and server 10 may include module 110. Furthermore, in embodiments, the capabilities of the security software component and the private DNS component may be integrated into a single software component. Additionally, in embodiments, the benefits of distributed computing may be leveraged and actions that are attributed to an on-device component in the specification, may be performed off-device by an off-device software component, and vice versa—actions that are attributed to an off-device software component in the specification, may be performed be performed by an on-device software component.

Regarding FIG. 2, for example, privacy leaks through standard DNS can be reduced by using security component plus Private DNS 104, 110. Privacy leaks associated with connections being HTTP instead of HTTPS can be addressed by security component 106 or 112 forcing HTTPS instead of HTTP connections where a domain that supports HTTPS connections is known to private DNS 108 or 114. Privacy leaks associated with TLS SNI being in cleartext (i.e., without ESNI) can be addressed by security component 106 or 112 forcing a VPN to be on for that connection. Privacy leaks associated with the IP address used for connection may be addressed by security component 106 or 112 forcing VPN to be on for that connection.

Additionally, in embodiments, with the security component being associated with the private DNS component, the security component is privy to the identity of the domain name. As a result, the security component may access information regarding the domain name, e.g.: is that domain a good domain, a bad domain, or a new or unknown domain. The security component can perform this look-up at the same time as the DNS resolution, which makes for a more efficient use of device bandwidth.

In an embodiment, the security component may access information regarding the domain from a server or service that provides domain reputation data. While the security component is receiving domain information, the private DNS component forwards the DNS request to an actual DNS server, which is preferably a well-vetted open source DNS recursive resolver.

Thus, in embodiments, the capabilities discussed with regard to a security component or a private DNS component may be supplied by other actors, such that any particular software component may in fact be multiple components executing on multiple servers, the capabilities of which are aggregated.

In addition, in embodiments, a combination of enterprise policy and/or user preferences may assign different levels of privacy to different connections. Such embodiments would allow the allocation of a desired level of privacy to an individual connection according to a user preference, such as a required or perceived need for privacy on the particular connection. For example, a VPN level of privacy may be allocated only for the connections where it is needed—as determined by a policy created by the individual or an enterprise administrator. Such embodiments may require a certain level of privacy regardless of the perceived security or insecurity of the connection, e.g., a hotspot. Rather, the level of privacy of the connection may be determined by the target domain, or a category associated with the target domain. In other words, such embodiments assign desired or required levels of privacy regardless of the location (e.g., home, work, coffee shop Wi-Fi, or even cellular network).

Regarding embodiments that address DNS privacy leaks by implementing a private DNS mechanism. Security components of such embodiments may have access to or generate information, e.g., a database, regarding the top N sites. The information may include, for each site, characteristics regarding the types of connections supported by the site. For example, the information may include whether these sites accept HTTP connections or whether they always use HTTPS. A site that always uses HTTPS likely does not leak content sent over the connection from device to server. Similarly, such embodiments may, for the top N sites, determine whether these sites support ESNI (encrypted SNI).

A security component may also have access to a list of domains, e.g., generated by an enterprise or a user, of domains or categories of domains (e.g., streaming media), where the enterprise or user does not need privacy protections (i.e., a "DO_NOT_CARE") list.

Similarly, a security component may also have access to a list of domains or categories of domains where the enterprise or user DOES need privacy protections (i.e., a "DO_CARE" list). Such a list may also include the level of privacy protection that is required when connecting to the domain or domains of a certain category, e.g., HTTPS or TLS required (designated perhaps as "PROT_TLS"), ESNI or protected SNI is required (designated as "PROT_SNI"), and IP address protection is required (designated as "PROT_IP"). Such lists may be supplied by, e.g., an administrator, or a service may provide suggested lists, which may be modified by an administrator. In addition, third party may provide categorized lists of websites and domains. For example, domain X is a financial services domain and domain Y is a healthcare provider domain. An administrator may then assign a required level of privacy to one or more categories of domains in the categorized lists and provide the security component with access to the categorized lists of domains. Similarly, certain domains may receive an individual required level of privacy, or lack thereof. For example, for a streaming video like site like YouTube, an administrator may not care about privacy. However, for a domain that is related to a financial account, the administrator may designate that a VPN is required.

In embodiments, agent 104 using security component 106 may monitor connections being made via VPN APIs on, e.g., a mobile device (or other client device such as a laptop or other personal computer), to observe packets, connection endpoints (IP addresses), and the like. In such embodiments, when a DNS request is made, the private DNS component obtains and provides the DNS information. It also provides, via the security component, information regarding the categorization and assessment with respect to enterprise (or user) policies as to whether the domain is a safe place to go. In addition, it also provides metadata associated with the domain, such as whether this site always uses HTTPS or not, whether it supports the use of ESNI or not.

Thus, in an embodiment, agent 106 operating on device 12 is intercepting the DNS requests coming from applications on the device and then communicating to server 10 which provides the DNS resolution and information regarding the domain for the security component.

In embodiments, the domain name is used in addition to the IP address because the domain name may be altered to include an identification of an enterprise or user associated with the DNS request. By identifying the enterprise source of the request, the server DNS component is able to retrieve the correct certificate for communications with the enterprise or user. Also, for both server and device-based security components of the DNS mechanism, using the identity included in the domain name the security component may also identify a policy associated with the enterprise and determine whether communications with the target domain, or target category of domains, are required by the enterprise policy to be over a connection with a required level of privacy. For example, in an embodiment including an agent, the agent may intercept a DNS request and specify DNS over TLS (DOT) or DNS over HTTPS (DOH) depending on a policy associated with the device and the domain name or domain category returned by the security component. In an embodiment, in one mode and as discussed within, the agent is the actor that talks to the DNS server. DOT, having less overhead, may be a preferred choice. In an embodiment without an agent, the system-level DNS for the device is configured to connect to a particular DNS server with a fixed domain name and IP address. In the agent-less version, e.g., module 110, in which the device has been configured to use a particular DNS resolver 114 (e.g., given a particular IP address). In that instance, server 10 with private DNS 114 is the proper addressee using DOT or DOH.

In embodiments, the enterprise policies re DO_CARE and DO_NOT_CARE lists may be made available from a server to the mobile device. Each list may be part of a database that also has information about how each domain operates (historical data) and an administratively designated level of privacy required for communications (for the domains or categories of domains in the DO_CARE list). The information associated with each domain or category may be compiled in a number of ways, including: being supplied by the provider of the private DNS mechanism based on past usages; being curated for the enterprise or user by third parties; and being supplied directly by an Enterprise administrator. Thus, with the Enterprise identified in the DNS request, the DO_CARE and DO_NOT_CARE lists may be tailored for the identified Enterprise. That is, the devices associated with Enterprise A may be provided with a DNS server IP address and name that is associated with Enterprise A, and that is different from an Enterprise B—even though Enterprise B accesses the same service for processing DNS requests and increasing privacy, e.g., module 110.

In an embodiment using an agent 104, the agent is provided with the DO_CARE and DO_NOT_CARE lists. If the agent, in determines a connection is being made to a domain on the DO_NOT_CARE list then the device agent allows the connection to proceed without modification. However, if the connection is being made to a domain or category on the DO_CARE list, then different actions may be taken depending on the level of protection required (e.g., a "PROT_*" level of protection) according to a policy.

In an embodiment, three levels of privacy protection are provided: PROT_TLS, in which HTTPS or other form of TLS protection is required; PROT_SNI, in which ESNI or protected SNI is required, and PROT_IP, in which IP address protection is required. In embodiments, the granularity of the levels of protection may be increased to include more than three levels, or fewer. In addition, in embodiments, within any particular level of protection, additional requirements may be specified. For example, a requirement of PROT_TLS may also specify that a particular TLS protocol be used, or a particular version of TLS, e.g., TLS 1.3. Also, in this discussion the use of "PROT_*" and the related TLS, SNI, and IP levels of protection are employed for convenience and should not be construed to limit the number of levels of protection or the designations of any level of protection.

In embodiments, if agent 104 or module 110 determines that the apparent connection supplies a privacy level that is appropriate for the target domain or category of domain, according to a policy, then agent 104 or module 110, allows the protection to proceed. If the apparent connection does not supply an appropriate privacy level, then agent 104 or module 110 directs the use of a connection with an appropriate privacy level.

For example, if the PROT_* is PROT_TLS and the domain is known to always use HTTPS or other TLS, no further action is required. But, if the domain is not known to always use HTTPS or other TLS (or the DO_CARE relates to a category), then the agent directs the use of a VPN tunnel to transport the traffic for that connection.

If the PROT_* is PROT_SNI, it is possible that the client application on the mobile device that is initiating the communication does not support using ESNI. It is also possible that the server on the domain does not support ESNI. It can be determined by the agent 104 from the DNS information if ESNI information was supplied in the DNS response. If ESNI information wasn't supplied, then agent 104 determines that ENSI is not available and directs the use of a VPN tunnel to this domain. If ESNI was supplied, the agent still does not know if the connecting client application on the device will, in fact, use the supplied ESNI information. Subsequently, the agent may observe the packets or stream sent to the domain (e.g., by the agent using VPN APIs to observer the communication packets), and determine whether the SNI is being communicated in cleartext or if ESNI is being used, e.g., by the agent determining whether SNI is being sent in clear text, or whether TLS extensions for ESNI (ECH) are being used. If ESNI is being used as required by PROT_*=PROT_SNI, then the agent, via the device VPN APIs, allows the connection to proceed without modification, because the SNI information is being protected. If it is not, then the agent directs the use of a VPN tunnel to this domain (i.e., the agent or module directs PROT_IP).

If PROT_IP, then agent 104 or module 110 always directs the use a VPN tunnel for the related communication. Regarding the protection provide by a VPN tunnel (PROT_IP), the use of a VPN tunnel may be directed when even the IP address of the target domain is to be kept private. For example, even if ESNI (ECH) is used, the IP address may be observed by an on-path listener. Knowledge of the IP address may be correlated to a particular service (e.g., a financial service). Thus, the analysis of the traffic and IP addresses can yield private information. For this reason, a VPN tunnel may be used, which does not yield an IP address to an on-path listener because the packets are encrypted.

In an embodiment, a hierarchy of protection may be as follows, where privacy is not a consideration, an HTTP connection may be acceptable. Where the encryption of data is required HTTPS or other use of TLS may be acceptable (PROT_TLS). Where encryption of data and SNI information is required, ENSI (ECH) may be acceptable (PROT_SNI). In situations where PROT_SNI is required and it is determined (e.g., by agent 104 monitoring the handshake, or from data associated with the target domain) that ENSI is not or will not be used and SNI will flow in cleartext, then a VPN will be required (PROT_IP).

In embodiments, the actual level of privacy and associated required protocol level may be varied arbitrarily. For example, TCP is a lower level protocol than HTTP, but may be acceptable for communication to some target domains. Privacy protection using a TLS layer may be obtained in many ways, e.g., SMTP or POP or IMAP connections (for email) may use TLS. Additionally, DTLS is a TLS implementation atop UDP instead of atop TCP.

Regarding the observation by agent 104 of packets, there are two types of communications that may be observed: communications intended for the DNS server and communications intended for the target domain. For communications intended for the DNS server, a standard DNS request structure called EDNS(0) will indicate which DNS extensions are present. Thus, it is possible for the agent to determine in a standard way if ESNI (ECH) information is present. That is, in viewing the DNS packet, the agent may determine that EDNS(0) extensions are present and if so, whether an extension for ESNI is present. If an extension for ECH is observed, then the agent determines that PROT_*=PROT_SNI is satisfied.

Agent 104 may observe (or otherwise determine) the DNS information being used to resolve the DNS request; and agent 104 may observe DNS and SNI information supplied in the DNS response. To actually observe ESNI (ECH) packets agent 104 needs information (from the DNS request) to be able to retrieve the public key of the intended domain—because ESNI (ECH) communications are encrypted from the outset. However, agent 104, using VPN APIs that allow the agent to observe all packets coming to and from the device, can determine if SNI information is being communicated in the TLS handshake or if the TLS handshake uses the ESNI (ECH) protocol. Thus, the agent may confirm the use of the ESNI (ECH) protocol even if the agent cannot see the content of the ESNI packets. In that way the agent may confirm the use of the ENSI protocol and if that protocol meets or exceeds the required level of protection for the target domain or category (e.g., PROT_SNI), then the agent allows the connection to proceed.

If the domain is not on either list (DO_CARE or DO_NOT_CARE) then a default enterprise policy or user preference can be used.

In an embodiment that includes agent 104, agent 104 may use a VPN API to have visibility into connections made by device 12. The VPN API allows agent 104 to both observe a connection and optionally modify the connection. Agent 104 may then direct DNS requests to a specific private DNS server or service for resolution, and observe communication packets in the subsequent connection to the target domain. In an embodiment that does not include agent 104, device 12 may be configured to direct DNS requests to a private DNS, e.g., private DNS 112 of module 110. And in an embodiment with both agent 104 and module 110, device 12 may be configured to direct DNS requests to a private DNS, e.g., of module 110, and agent 104 may use the VPN API to observe communication packets in the subsequent connection to the target domain. The effect of this embodiment is that the device itself, being configured to send DNS requests to a specific server via either DOT or DOH, makes for less "work" for the agent.

In embodiments employing agent 104, a feature of agent 104 is the ability to inspect the actual communication made after the DNS resolution. For example, when device 12 is configured to direct DNS requests directly to module 110 and when agent 104 is tasked with directing DNS requests to a specific private DNS server, the subsequent connection to the target domain may still lack privacy, e.g., the subsequent connection may in actuality only be an HTTP connection instead of an initially purported HTTPS connection. Agent 104 using the VPN API may determine in the subsequent connection that SNI information is exposed—indicating that HTTPS is not being used. Thus, the use of agent 104 allows both the initial DNS request to be directed to a private DNS service, e.g., DNS component 112, and also the subsequent vetting of the actual connection to confirm the privacy level.

Additionally, in embodiments, the user of the device may have specified the user's own DO_CARE or DO_NOT_CARE list entries, which may be used in combination with lists provided by an enterprise, or third party. In embodiments, the higher of the privacy levels specified for an entry (domain or category) is implemented by the system. The net result is that the appropriate level of privacy protection is implemented, based on enterprise policy and/or user preferences, while conserving device and infrastructure resources by using only the level of privacy protections necessary at a connection level.

Thus, in embodiments, resources are conserved by matching a privacy level of a communication with an appropriate privacy level as determined by a policy. In embodiments, an initial privacy level of a connection is maintained, if that level is equal to or more private than the level as determined by the policy. But, if not equal to the level, the method directs the connection privacy level be upgraded to the level of the policy. The embodiments conserve resources by not defaulting to the use of a VPN tunnel.

In an embodiment, it may not be possible to create a VPN tunnel for a connection after a TLS session has started. However, agent 104, using a VPN API, may observe if SNI or ESNI was used for connections to a domain, and can inform a cloud server, e.g., module 110, of that information. Afterwards, agent 104 and other agents with access to information from module 110, may direct a connection upgrade if the previous information on the domain indicated that connections to the domain were somehow downgraded in privacy, e.g., used SNI when ESNI was directed, or used HTTP when HTTPS was directed. In an embodiment, information provided to a cloud server, e.g., module 110, regarding a connection to a domain tracks whether a downgrade to the connection was caused by device 12 or the target domain. For example, by agent 104 observing a TLS handshake, agent 104 may determine whether client device 12 tried to use ENSI (ECH) and whether the target domain supported the use. Thus, with such historical information regarding connections to a particular domain, agent 104 or module 110 may direct an upgrade in a privacy connection in advance of the start of the intended connection, e.g., where a communication is required to be an ESNI (ECH) connection according to policy, and agent 104 or module 110 determines that the target domain has not supported ESNI (ECH) in the past, agent 104 or module 110 may direct the use of a VPN tunnel—before it is "too late."

In embodiments, a policy may be conditional. For example, a policy (from enterprise or user) may specify that until more is known regarding a domain, communications are to use a VPN tunnel, but that after the system receives more information, e.g., confirmation of the domain's adherence to a connection protocol) and depending on the level of privacy required (PROT_*), communications may employ other connection protocols—avoiding the use of a VPN. For example, a policy may specify waiting until a number of connections having used ESNI information (e.g., to a target domain, or from device 12) has met or exceeded a predefined threshold number before electing to assume that ESNI will be used. Thus, agent 104 may wait until the number of connections having used ESNI information has met or exceeded a predefined threshold number before allowing ESNI connections to proceed without being upgraded.

In an embodiment, agent 104 or module 110, does know if the client application on device 12 intends to use ESNI because ESNI information may be detected in the DNS query in an EDNS(0) extension. If detected, the system can assume that device 12 will in fact use ESNI and thus can meet the requirements of a PROT_SNI policy specification. Agent 104 may also observe using the VPN APIs whether device 12 does, in fact, use the ESNI information during its TLS handshake. If the device does not use the ESNI info and, instead, sends the SNI information in the clear, agent 104 may notify the module 110 that at least in this device the request for ESNI information for this domain doesn't in fact use it. This information can be used to advise what is to be done to enforce policy on other devices, e.g., perhaps other similar devices in an enterprise fleet. Also, agent 104 and module 110 may retain the information that, on device 12 and for the particular domain, even if ESNI info is requested (PROT_SNI is requested) it is not used. Instead, agent 104 and module 110 may enforce an appropriate policy as if ENSI information will not be used. In addition, agent 104 may observe subsequent connections to the domain in question, and if ESNI info begins to be used, agent 104 may retain the updated information locally and provide that updated information to module 110.

In embodiments, historical data regarding connections to domains may be collected, e.g., by module 110 and stored in network-accessible database. Thus, for a domain in the database, when module 110 or agent 104 determines that a connection to the domain is intended, the historical data from the database may be retrieved to determine the history of connections to the domain, and act accordingly. For example, if the historical data indicates that ESNI (ECH) information has always been used, and a policy requires SNI information be protected (PROT_SNI) then agent 104 or module 110 may simply allow an ESNI connection to proceed without upgrade.

Similarly, in embodiments, agent 104, using the VPN APIs can observe if connections to a target domain (rather, connections made to one or more of the IP addresses which were returned to the client application in the DNS response for the A or AAAA query for a given domain; we are making an inference that a connection to one of those IP addresses is for the given domain) do in fact use TLS or just connect in the clear with a HTTP request in cleartext; we can send this information to a server in the cloud to remember that info and advise other agents on other devices; and or we can remember that information locally, in support of PROT_TLS protection level.

FIG. 2 illustrates an additional benefit of agent 104 or module 110 having access to historical data regarding connections to a target domain—the efficiency of communications to the target domain may be increased. For example, when connecting to www.example.com, historical data may show that connecting to www.example.com results in multiple subsequent DNS requests 116 that pull content from the multiple additional domains. Thus, in embodiments, when agent 104 or module 110 provide a DNS resolution to a request for www.example.com, agent 104 or module 110 also retrieve (or "pre-fetch") the DNS resolution for the associated target domains—preventing the need for additional DNS queries. With private DNS 108, 114 in possession of pre-fetched information, private DNS 108, 114 need not send subsequent requests for that information for resolution. Instead, private DNS 108 or 114 may simply respond with the pre-fetched information.

In addition, of the additional domains, information from the database may indicate that certain databases 118, 120 are undesirable, e.g., because they are trackers. Domains 118, 120 may be blocked by agent 104 or module 110 in the response to the DNS request. Furthermore, DNS pre-fetching may be informed by predictions and Machine Learning. In addition, such information may suggest combining DNS responses, as when a browser sends a DNS A request then a subsequent DNS AAAA request. Agent 104 or module 110 may, instead, respond to either the DNS A or DNS AAAA request with a response containing both A and AAAA responses.

An embodiment may be used to address the situation in which multiple domains that use the same IP address. In such situations, the confidence in an inference of which domain is being connected, where the inference is based on a correlation of IP address to domain name, where the correlation is itself based on DNS response info, could be reduced. To minimize reduction in the confidence of the inference, the private DNS component 108, 114 may perform the following. Where the TTL (Time To Live) in a DNS response received by DNS component 108 or 114 may be a first value, e.g., 60 s, DNS component 108 or 114 supplies a smaller TTL value, e.g., 1 s, to a local client application 101. The smaller TTL value forces the local client application to make DNS requests to private DNS components 108 or 114 more frequently, permitting the system to have more confidence in inferring from the more-frequent client DNS requests which domain is being connected to. The provision of smaller TTL values does not result in more DNS requests being sent off the device because the local DNS resolver has the original, real TTL value and keeps that information in private DNS component 108 or 114's cache of DNS information.

Additionally, in another embodiment, the private DNS component 108 or 114 can keep information even after it should have "aged out" of the cache due to its original TTL value. The retention of such DNS information past its TTL value provides protection against the possibility that the DNS information becomes unavailable, e.g., due to the unavailability of the remote DNS recursive resolver. The DNS information that was retained beyond its original TTL value (to an extended TTL value (or "eTTL" value), may be returned to a requesting client application when new DNS information cannot be obtained.

In another embodiment in the event of the unavailability of the preferred remote DNS recursive resolver, the local DNS resolver may connect to one or more alternative remote DNS recursive resolvers after detecting the unavailability of the primary one. During such a period of unavailability the local DNS requester may, at preconfigured intervals (not necessarily periodic intervals), attempt requests to the preferred remote DNS recursive resolver. Should such an attempt succeed, then the local DNS resolver may revert to normal operations using the primary exclusively.

That repeated DNS requests permit more confidence in the inference of which domain is being connected to, there are two time elements at play. In the first element, the DNS component requests an IP address for a first domain. In the second element, agent 104 observes the connection using VPM APIs to confirm and correct (if possible) the privacy level of the connection according to policy. The issue is that, if the connection observed by agent 104 does not include SNI, then agent 104 is only is able to know what IP address the connection is using. So, if the IP address is associated with more than one domain, agent 104 cannot determine which policy to apply—there may be one policy for one domain and not for another domain, even though they go to the same IP address. In such cases, more confidence may be had in the association of the requested domain name with the IP address provided when there is a repeated, close temporal relation between the domain name in the DNS request and the IP address being connected to, i.e., if abc.com was in the recent DNS request and IP address 1.2.3.4 was connected to, then there is greater confidence in the inference that abc.com is associated with 1.2.3.4. In contrast, if an extended time has passed between a DNS resolution for abc.com, and there was a subsequent DNS resolution for xyz.com that provided the same IP address as abc.com, then private DNS component 108 or 114 cannot have confidence that the cached 1.2.3.4 information is related to the abc.com DNS request.

Thus, in an embodiment, the ability of private DNS component 108 or 114 to provide an artificially low TTL value with an IP address in response to the DNS request, and still cache the original TTL value, allows the DNS component to make a temporal correlation between use of the IP address in the cache and the domain requested in a subsequent DNS request.

In an embodiment there is a PROT_TLS_REALTIMECHECK that is more stringent that PROT_TLS. The mechanism may also be used to implement a stricter PROT_SNI_REALTIMECHECK level of protection. The mechanism involves doing a local, completely on-device way of interposing the local device's agent into the HTTP or HTTPS connection. In the embodiment, agent 104 acts as a man-in-the-middle (MITM) to confirm that an inference based on historical data from the database regarding a connection to a domain is, in fact, actually implemented. In other words, where historical data show that 99.999% of connections to a domain use TLS, in the PROT_TLS_REALTIMECHECK agent 104 acts as a MITM to confirm the actual connection privacy level is PROT_TLS. That is, in the embodiment, agent 104, using VPN APIs, inserts itself in the DNS request/response flow, when it observes a DNS request from a client application—that is, the agent pretends to be the originally-intended DNS server, and provides a DNS response to the client application; the agent may use an off-device recursive resolver to obtain the DNS information, or the agent may perform the functions of a DNS recursive resolver, or the agent may provide DNS information from the agent's own cache of DNS information. In other words, a device configuration for DNS resolution may be to use (by default) the DNS provider information from the network connection (via DHCP protocol). Optionally, the device may be configured to go to a different DNS server (via user modification or via an MDM push of configuration information). The agent is not officially "configured or designated" as the DNS provider; but the agent can make changes to a DNS request by routing it elsewhere, or by terminating them and substituting for the original request the agent's own request for DNS information.

Agent 104 then views the initial connection request. If the request includes a naked HTTP request (a non-TLS handshake), then it isn't actually a PROT_TLS level request. Agent 104, as a result of the connection not being in accord with policy, will redirect the connection to an HTTPS connection, which is a PROT_TLS communication level. In other words, if the initiating client device application does not use HTTPS (TLS), but it is known that the destination server supports connections via HTTPS, then agent 104 redirects the local client to the corresponding HTTPS URL. If the requisite privacy level is, instead, PROT_SNI or PROT_SNI_REALTIMECHECK then agent 104 may examine whether ESNI information is being used. If it is not, agent 104 may redirect to the same URL but this time force the connection to the real destination server using a VPN tunnel to protect the SNI information.

Gray Domains

Figure 3:
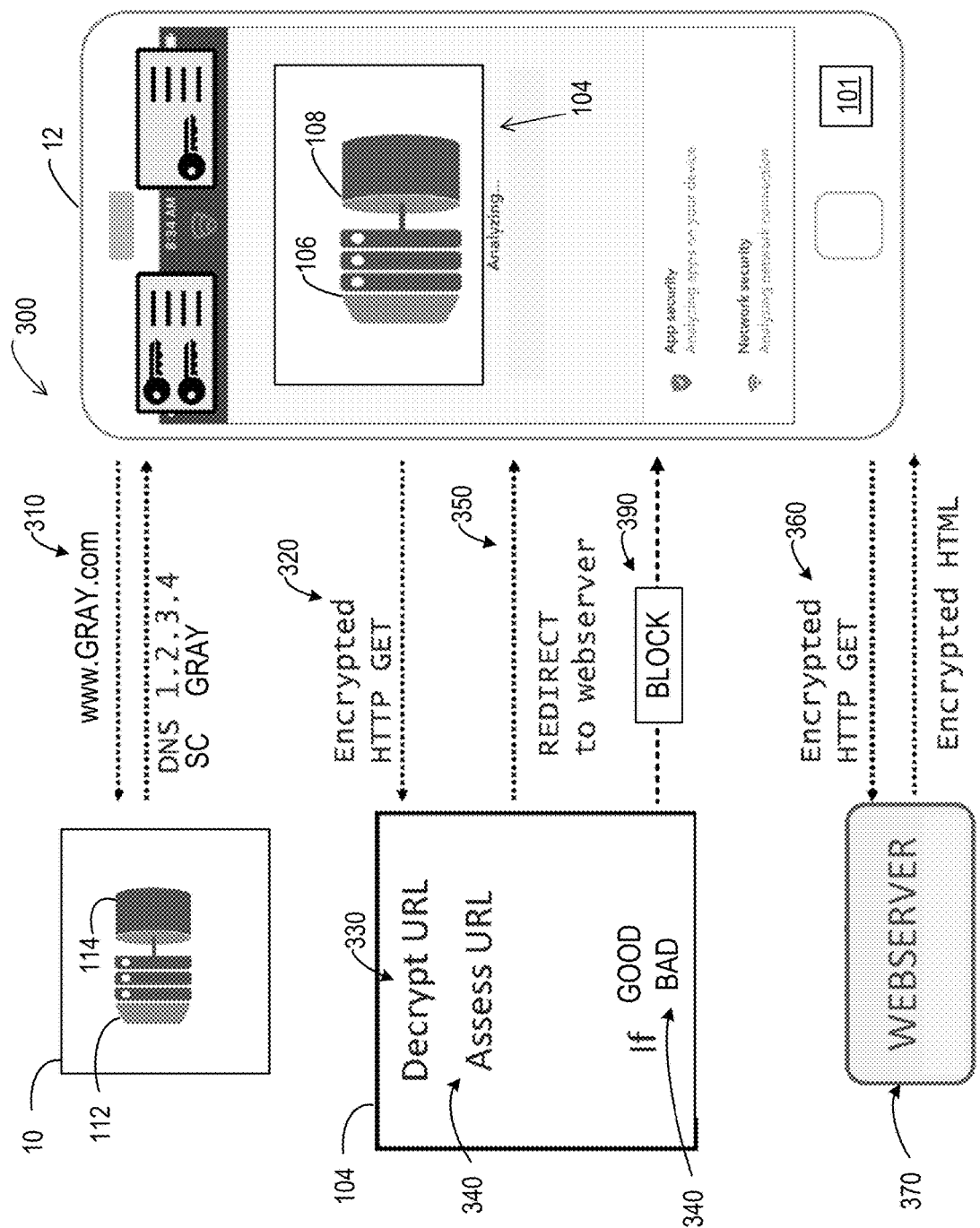
FIG. 3 is a diagram of an embodiment of a system for evaluating gray domains.

In some embodiments it may be difficult to evaluate the full URL. Some domains may have both good and bad URLs hosted on them. These domains can be referred to as Gray domains (i.e., domains with content that is neither all black/bad, nor all white/good). FIG. 3 illustrates an embodiment 300 of a system for evaluating gray domains. It is generally not desirable to either allow or block all the gray domains because it will make good content not accessible or bad content accessible. Thus, if a gray domain is encountered, the domain name, by itself, is insufficient to allow agent 104 or module 110 to make a determination as to whether the browser or application can safely communicate with the domain. It is necessary to discover the full URL being used for the communication in order to make an assessment.

In an embodiment, when a gray domain in encountered, unencrypted traffic 310 can be examined by agent 104 using on-device VPN APIs, which in this instance are not actually creating a VPN tunnel for the traffic, but rather are simply examining the information that the requesting client application or browser is sending by playing the role of the server at the intended gray domain, i.e., acting as a webserver. By doing this examination of the intended communication, a determination can be made by security component 106 regarding whether the domain content is "good" or "bad." If the communication from the requesting client application or browser is encrypted 320 (e.g., with TLS, an HTTPS connection, or the like), then security program 106 may interpose itself to intercept the communication, and, using the certificate from the on-device certificate authority (CA) in device 12's trusted certificate store and a signing certificate for security component 106 (with the certificate private key, stored securely on the device and accessible only to the security program) security program 106 may decrypt 330 the communications in order to discover the full URL and make an assessment 340, e.g., by comparing the full URL to historical information from the database associated with the full URL.

In an embodiment, when agent 104 interposes itself in a communication using VPN APIs, agent 104 will respond as if it were the target webserver. In doing so, agent 104 will response to the TCP handshake and subsequent TLS handshake (which establishes a secure encrypted channel). Agent 104 will send a server certificate for the gray domain (signed by the CA signing certificate which agent 104 retrieves from secure storage), so that the TLS encrypted connection can be properly established. At this point the sending application (an app or a browser) sends using the HTTP protocol a request for a particular URL. At this point, agent 104 can inspect the URL. Optionally, agent 104 applies (or initiates the application of) a machine learning or lexical URL analysis model to determine if the URL is inherently risky or not. agent 104 may also have whitelists and blacklists locally on the device to determine if the URL is good or bad. In some embodiments, agent 104 may send the URL offline for analysis, e.g., to module 110 and security component 112 for evaluation which will return a response of GOOD or BAD (or possibly UNKNOWN).

If the assessment is "good," agent 104, which, again, is acting like a webserver in communication with the requesting app or browser on the device, performs a redirection 350 to the actual gray domain server on the internet. This redirect may be via a variety of means, e.g., by responding to the initial HTTP request (which is usually an HTTP GET method, but can be any other well-known HTTP method such as POST or HEAD or PUT or PATCH or DELETE or other HTTP methods) with an HTTP 3xx redirection status code, usually a HTTP 307 Temporary Redirect (although a 302 or 303 or 308 or other 3xx code could be used). This response is accompanied with the URL to which the browser or app should redirect. Upon the app or browser receiving this HTTP response, it will reconnect 360, and agent 104 (using the VPN APIs) no longer interposes itself in the communication but rather simply passes along the communication to the intended gray domain server 370. In the redirect, various methods can be used to prevent the requesting app or browser observing that the redirected location is the same as the original location and detecting a redirect loop. For example, the redirect URL may be modified in one of several ways that do not meaningfully change the semantics of the URL request, such as: appending an anchor name (e.g., by appending to the URL "#notexistinganchor"), or by appending a non-existent parameter after the question mark in the URL (e.g., inserting a question mark if it was not already there, as in: " . . . EXISTINGURL . . . ?notexistparameter=1" or " . . . EXISTINGURL . . . ?realparameter= realparamvalue¬existparameter=1"), or the like. Such methods can prevent a requesting browser or app from thinking that a redirection loop is occurring. The redirect to remove agent 104 from the communication is advantageous because it increases performance—agent 104 no longer has to observe every packet in the communication.

If the assessment or the URL is BAD 380, then agent 104, acting as a webserver to the requesting app or browser, can return a "block" page 390 instead of a redirect. Generally, it is preferable to notify the user when a communication is blocked. In an embodiment, in which the block is at a DNS level, agent 104 is not inserted in the connection and cannot return an HTML "block" page, so a notification is pushed to the device to inform the user. In an embodiment, in which agent 104 is within the communication itself, agent 104 can directly send an HTML "block" page, which is seen by the user in the browser.

Thus, in an embodiment, a client application on device 12 may send a DNS request for resolution of a gray domain, e.g., www.gray.com. Agent 104, or module 110, may resolve www.gray.com to an IP address, e.g., 1.2.3.4, with security component 108 or 114 determining that the domain is a "gray" domain. In subsequent traffic to the gray domain, security component 106 may interpose itself, decrypt (if necessary), and assess the individual URL(s). Where a URL is assessed to be "good," the security component sends a redirect instructing the client application to communicate with the URL. When a URL is assessed to be "bad" the URL is blocked, e.g., a block page is sent to the client application instead of the redirect. In such a method, security component 108 or 114 see the full URL, but an enterprise associated with device 12 would not.

Regarding the decryption that enables the viewing of the full URL, a certificate containing only a public key is provided to the device and placed in a trusted certificate store on the device. A signing certificate containing both the private key and the public key is stored securely so that only the security component may read it. Thus the device will trust a website domain certificate that is signed by agent 104 using the signing certificate. This provides for inserting agent 104 as a MITM. Then, after a determination by security component 106 or 112 using information from private DNS 108 or 114 that a DNS request is to a Gray domain, agent 104 responds to a TLS handshake from the client application to the Gray domain instead of allowing the TLS handshake to create a connection to the IP address (e.g., 1.2.3.4) associated with the Gray domain. That is, agent 104 becomes a MITM and pretends to be the target domain. In the TLS handshake, agent 104 responds with a public key certificate that security component 106 generated for the connection (www.gray.com) and that is signed by the signing certificate placed in the trusted certificate store. With the private key accessible only to security component 106 of agent 104, and the public key in the trusted certificate store, agent 104 creates a new public certificate for the domain (www.gray.com). That is, security component 106 creates a certificate dynamically, on the fly, for the intended destination of the communication. That certificate is chained to the certificate which is in the trusted certificate store of the device. The result is that the dynamically generated certificate dynamically is trusted by the original client application because of the established chain of trust. Agent 104 then communicates in a handshake with the client application or browser, which sees the public key in the server Hello, and establishes a TLS connection with agent 104. The client application or browser then sends an HTTP get to agent 104, allowing agent 104 to observe the full URL. When a review of the full URL by security component 106 or 112 indicates that the URL is "good," it is no longer beneficial for agent 104 to remain as a MITM. Agent 104 then sends a redirect (e.g., an HTTP 30X) to redirect the device application or browser to the IP address returned in the DNS response (the "real" IP address). To prevent the device application or browser from flagging the redirect as a redirect loop, agent 104 decorates the URL in the redirect, e.g., with an anchor name that doesn't exist, or a parameter that doesn't exist. If the URL is "bad", agent 104, because it is part of the actual communication, can send an HTML "block" page, rather than a mobile notification that pops up external to the communication.

In an embodiment, the signing certificate and a CA (Certificate Authority) certificate that contains the private key for the signing certificate is stored in a trusted certificate store that is accessible only to the security program on the device, i.e., security component 106. This may be used by security component 106 to sign certificates for other domains. A CA certificate that contains the public key for the signing certificate can be placed in the device's trusted certificate store, so that the device will trust certificates signed by this CA certificate. The store accessible only to the security component on the device may include, e.g., the iOS keychain, or the Android keystore, or a trusted execution environment (TEE) on the device. In an embodiment, the operations using the signing CA certificate (creating a certificate for a gray or unknown domain) take place in a trusted app in the TEE. In an embodiment, the device operating system provides a service for the creation of such certificates to permissioned security apps. In an embodiment the CA certificate and the CA signing certificate are unique to the single device to which it is sent. In an embodiment the pair of CA certificates are sent to a small number of devices in an enterprise fleet, so that any detection of this certificate on an individual device cannot be used to identify this single device.

Where, generally, VPN APIs allow agent 104 to observe every communication from device 12, in an embodiment, VPN APIs are used to monitor only connections that go to specific IP addresses. The embodiment provides for "adding a route"—monitoring only the VPN APIs that go to selected IP addresses. Adding a route to a specific IP address allows security component 106 to ignore other IP addresses—lessening the impact of inserting agent 104 on communications with the "ignored" IP addresses.

In an embodiment, security component 106 may be configured to detect the full URL upon receipt of the indication that the domain name in question is "gray." A policy may be the source of this configuration. In embodiments, if other means for viewing communications from the device are available, agent 104 may use those means instead of VPN APIs.

Unknown Domains

Figure 4:
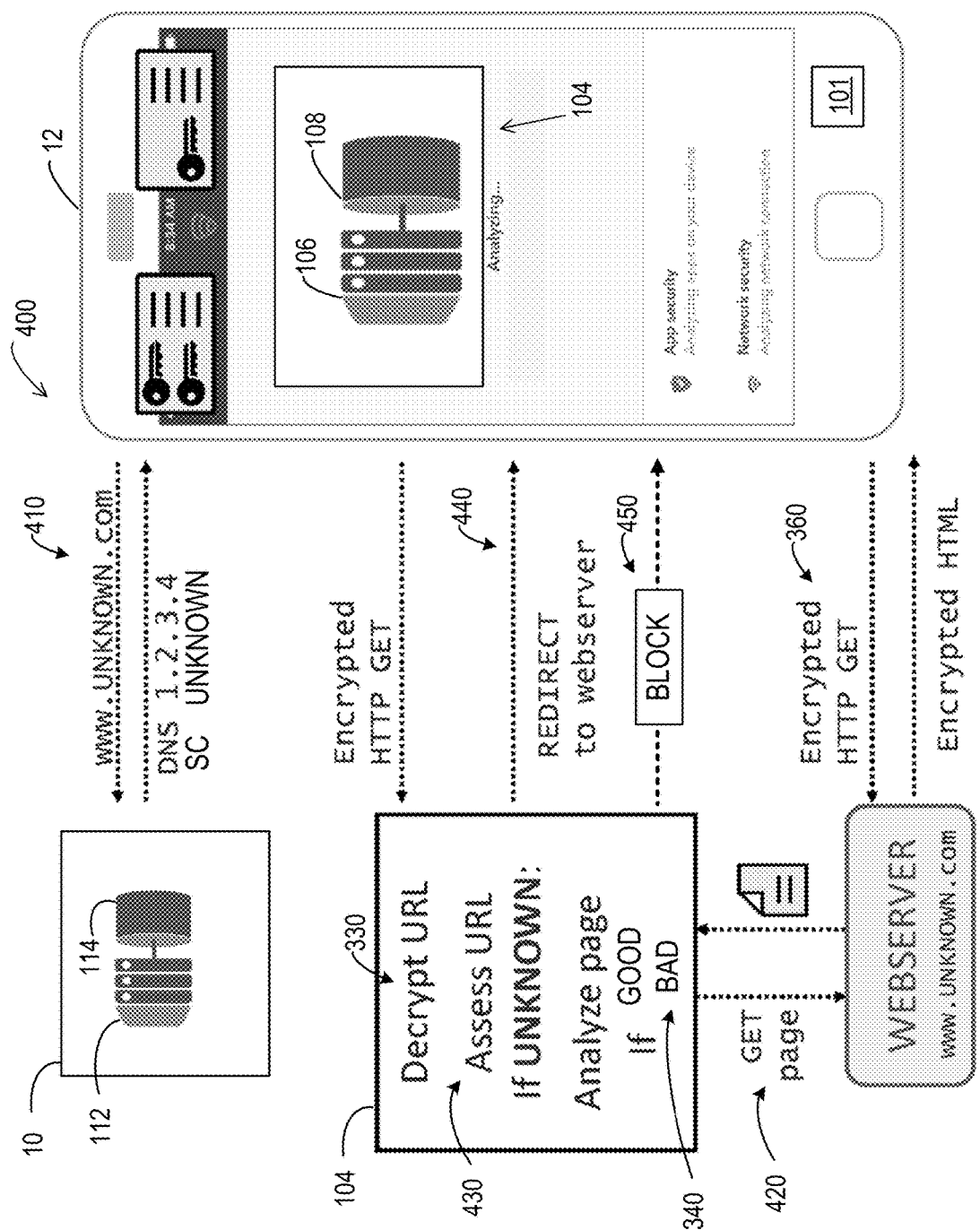
FIG. 4 is a diagram of an embodiment of a system for evaluating unknown domains.

In addition to domains on the DO_CARE and DO_NOT_CARE lists, there will be unknown domains, for which the system has no information. FIG. 4 illustrates an embodiment 400 for addressing such unknown or "new" domains. UNKNOWN protection, that is, the protection of a user or device when a requesting app or browser is trying to communicate with a domain whose assessment is UNKNOWN, can be improved by a method similar to that for GRAY domain protection. As described, agent 104 interposes itself in the communication, acting as a server or webserver, and can observe the URL in an unencrypted request 410. Then agent 104, acting as a web browser, can fetch 420 the page (as indicated by the observed URL in an HTTP request) and perform an analysis 430 on the device using security component 106 to assess whether the page is GOOD or BAD. For example, does the unknown domain look like a sign in page or a login page? Does it have visual similarities to sites that it is, in fact, not (does it look like a financial institution login page)?

In another embodiment, if a determination as to GOOD or BAD cannot be made using security component 106, the page content can be sent to module 110 on server 10, which, using security component 112, will return an assessment of GOOD or BAD.

In either case, if the assessment is GOOD, then agent 104, acting as webserver to the requesting app or browser, redirects 440 the requesting app or browser to the actual website, and no longer interposes itself in the communication. If the assessment is BAD, then agent 104, acting as webserver, returns a block page 450 to the requester. In both GRAY and UNKNOWN protection, the privacy of the user is maintained, and the use of the signing certificate and trusted certificate store CA certificate is for the purposes of protecting the user from potentially harmful sites or phishing sites or objectionable content, according to policies set by an enterprise administrator or the user or a combination thereof. In an embodiment, the policy could specify that unknown domains are blocked until a full analysis is performed. For example, it may be than a full analysis by security component 106 or 112 is not available or possible. The policy may require the unknown domain be blocked until a full analysis is made. Agent 104 may still be used to determine what the full URL is and supply that information to a cloud-based service, e.g., security component 112, for a full analysis of whether the unknown domain is GOOD or BAD.

Section 2

5G Device-to-Device (D2D) Policy

To control the availability of a device for D2D relaying, a user or an enterprise administrator for a device where the device is managed by the enterprise may wish to specify policies regarding the usage of D2D relaying. In an embodiment, such a policy may include one or more of the following provisions.

Completely disallow the use of D2D relaying.

Disallow the use of D2D relaying when the device is in certain locations (e.g., in enterprise workplace or sensitive locations, or outside enterprise locations, or in the device user's home).

Completely allow the use of D2D relaying.

Allow the use of D2D relaying when the device is in certain locations (e.g., in the enterprise workplace or outside the enterprise location, or in the device user's home).

Allow or disallow D2D relaying depending on the current battery level of the device (e.g., if battery level is lower than a threshold, not allowing D2D relaying).

Allow or disallow D2D relaying depending on a projected battery level of the device before the device is in a location where the device user can charge the device.

Allow or disallow D2D relaying depending on the recent ratio of durations or resource/battery usage during prior D2D relaying events. For example, there is a BENEFIT to D2D relaying when the user's device uses a different device to perform D2D relaying. In an embodiment the benefit may be measured by a time (X). Then, there is a CONSUMPTION event when the user's device is being used for D2D relaying of connections from other devices. In the embodiment, the consumption may be measured by a time (Y). If the ratio of BENEFIT to CONSUMPTION (amounts of time in different states (X/Y), or amounts of actual or estimated consumption of battery resources (estimated is how much more battery would have had to have been consumed had there been no D2D relaying via another device)) drops below a threshold, then no D2D relaying is allowed.

Similar to the above, but where D2D relaying involving another device is not considered harmful so long as the other device is managed by the same enterprise, consumption time attributed to the co-managed device is not counted as CONSUMPTION (time (Y)) or there is a weighting factor between 0 and 1 applied to such usage.

Methods may employ a software component with the ability to control the use of the device as a relay for 5G or other D2D signals according to any one or more of the above policies. The ability for a user or an enterprise to control D2D relaying via policy will be of great benefit to the user and the enterprise.

Figure 5:
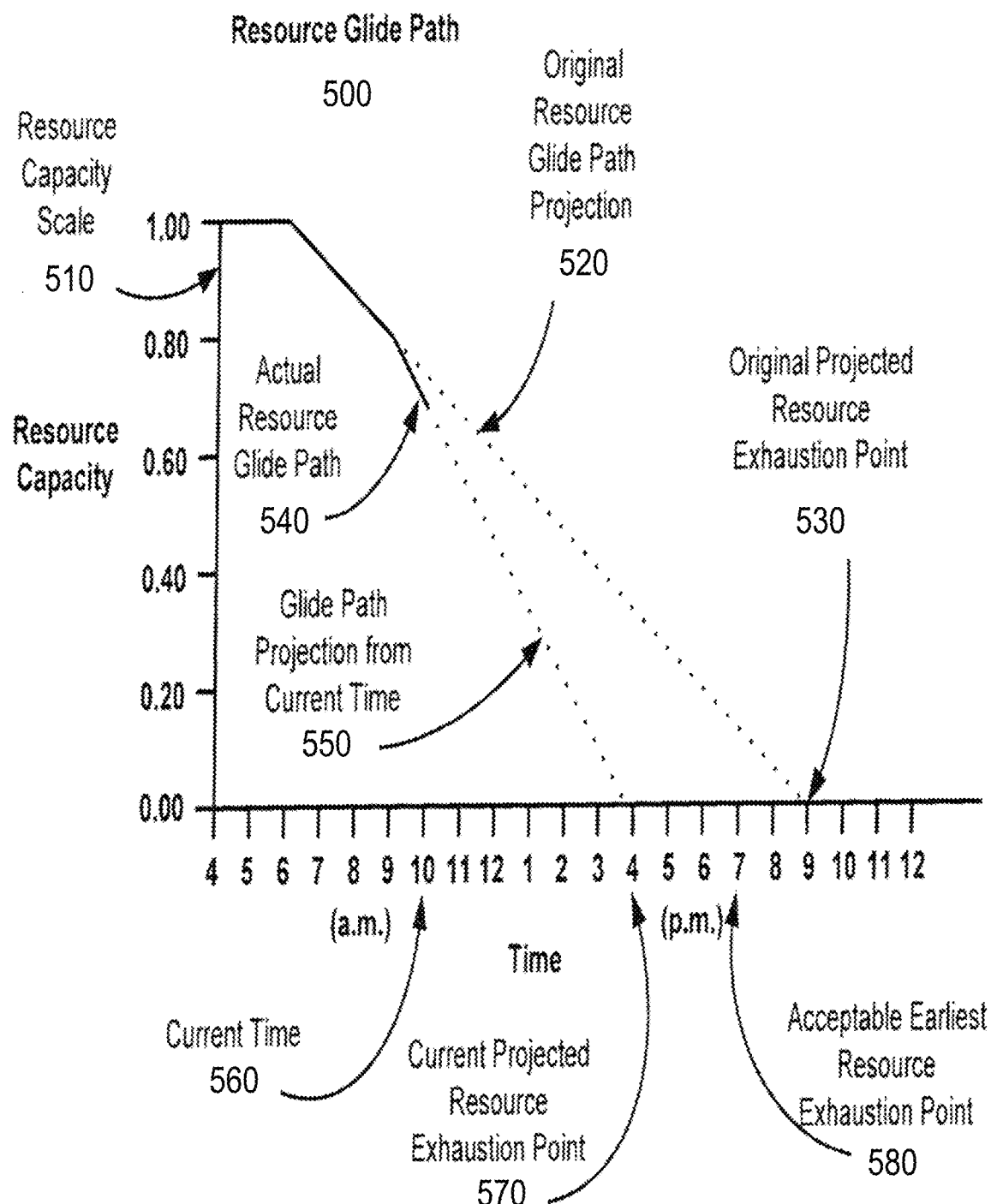
FIG. 5 is a graph illustrating the management of device resources.

Regarding the use of projected battery level as a factor in a policy for allowing D2D relaying, FIG. 5 is an example of a resource glide path 500. As shown in FIG. 5, the resource glide path is plotted on a Cartesian coordinate plane having an x-axis and a y-axis. The x-axis represents resource capacity. The y-axis represents time. The resource glide path 500 is a property of a resource prediction, or an active resource prediction. There can be different resource glide path properties for different resources that exist on the mobile device or other device connected to 5G. For example, the resource glide path 500 could be for a battery resource. In that case, the resource capacity scale 510 would represent the battery capacity, with 1.00 indicating a fully charged battery, and 0.00 indicating a fully discharged battery. A resource glide path projection 520 that is a property of a resource prediction is a resource prediction glide path; it represents a prediction of what is likely to happen in the future. The original resource glide path projection 520 represents a prediction that had been initially created (e.g., by the activity knowledge discovery manager) and placed into the active state store accessible to the device. The active state policy manager placed the resource prediction into the active state as an active resource prediction when it determined that the device conditions corresponded to this resource prediction. An active resource prediction can be modified by the active state policy manager while it is active according to changes in current device conditions. For example, additional information is available having been gathered by an activity monitor on the mobile device or other device. The actual resource glide path 540 represents the actual resource usage that was measured on the device. In the example of FIG. 5, more of the resource had been used than had been predicted; the glide path is below the original resource glide path projection 520. The active state policy manager has updated the resource glide path 500 accordingly with a new glide path projection from current time 550; the current time 560 is 10:00 a.m. This projection shows a current projected resource exhaustion point 570 occurring at about 4:00 p.m. The original projected resource exhaustion point 530 was at about 9:00 p.m. This time was after the acceptable earliest resource exhaustion point 580, and thus was by definition, acceptable. But the new exhaustion point occurs earlier. An active policy may take action because there is now a current projected resource exhaustion point 570 that occurs sooner than the acceptable earliest resource exhaustion point 580 which corresponds to the user's anticipated arrival at the user's residence where the user can charge the device battery. Thus, by policy, because the projected exhaustion point 570 has moved in advance of the earliest acceptable exhaustion point 580, the device in question may be directed to stop allowing itself to be used for relaying 5G communications from other devices. U.S. Pat. No. 8,655,307 discloses further aspects of device resource projection and management and is hereby incorporated by reference in its entirety.

Section 3
Safety Enhancements to Augmented Reality Systems
General

Figure 6:
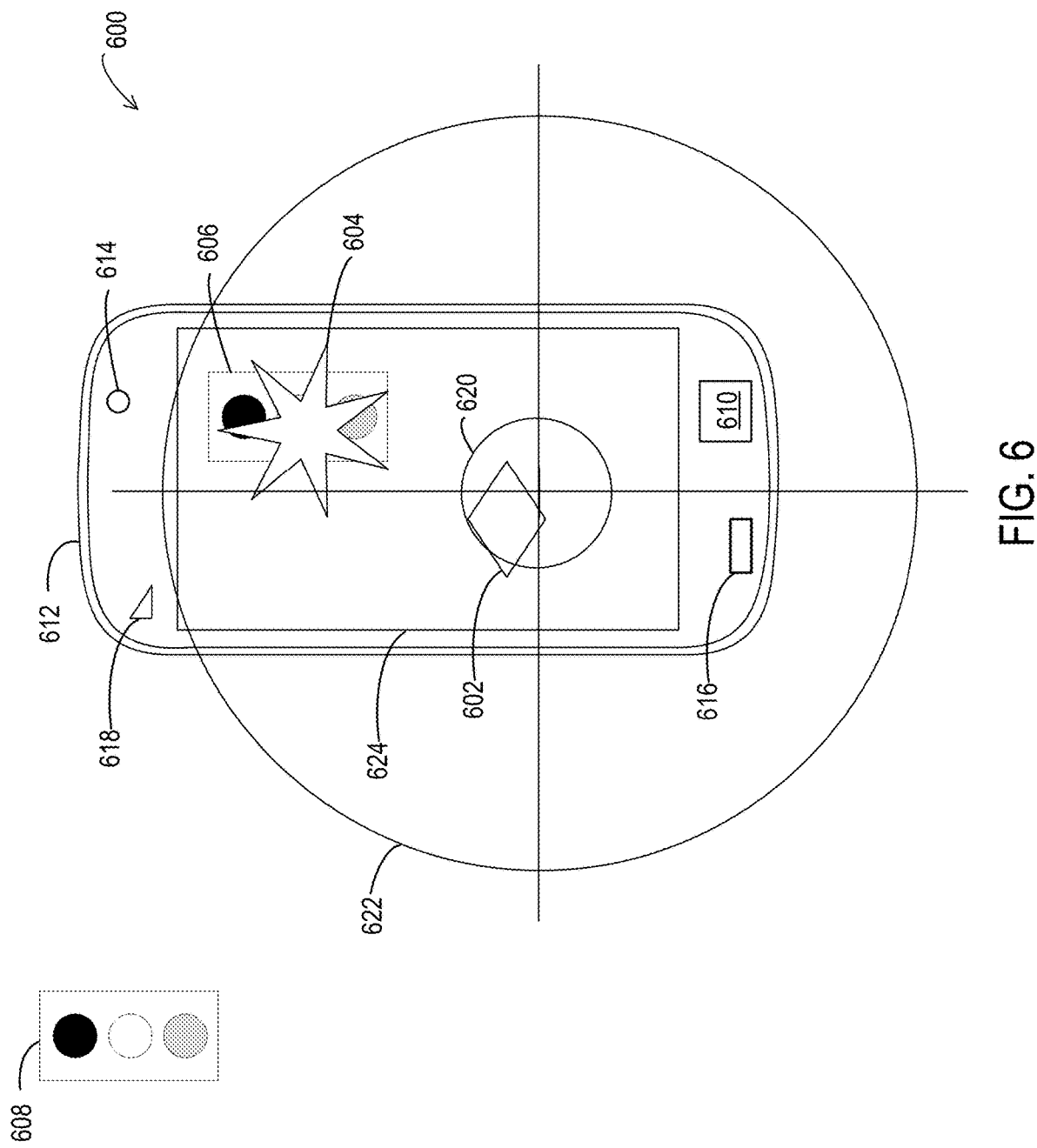
FIG. 6 is a diagram illustrating an embodiment of a system for augmented reality.

FIG. 6 illustrates an embodiment of a system and method for extended reality. In FIG. 6, system 600 illustrates a mobile communications device (MCD) 612 with a display 624 shown from the point of a user and held at approximately arm's length. On display 624 a virtual diamond 602 and a virtual star 604 are superimposed over an actual traffic light 606. A second actual traffic light 608 is shown as being in the background of MCD 612, but still within the peripheral view of the user. A camera (not shown) has acquired traffic light 606. While traffic light 608 is not depicted on MCD 612, the camera of MCD 612 may also be acquiring an image of traffic light 608. For example, the camera may be digitally zooming in on traffic light 606 and, if zoomed out, traffic light 608 may be in the optical field of view of the camera and would be displayed on MCD 612. Thus, the camera may acquire images that are not at the same time displayed on MCD 612 to the user.

FIG. 6 includes a crosshair 622 with a center circle 620 to illustrate where the user may be focused. Center circle 620 approximates the area of the display that is within the user's foveal view, which encompasses the central two degrees of the user's visual field. The foveal view is where the user has the highest definition visual resolution, and is where the user reads, and where the user's attention is; other parts of the visual field are not actively attended to unless something draws the user's attention, and the user subsequently shifts the foveal view to that area. When viewing a display at arm's length, the user must shift their gaze to bring different portions of the display into the view of the fovea.

In embodiments, with the user focused on virtual diamond 602, traffic light 606 may be ignored, particularly if partially or wholly obscured by virtual star 604. Furthermore, traffic light 608 may also be ignored when the user is focused on MCD 612. For these reasons, in an embodiment, MCD 612 is provided with a "guardian" (or "chaperone, "guide," or "XR manager") software component 610. Guide 610 receives or monitors both the virtual feed and the actual feed to the MCD display and audio output. Guide 610 may also receive or monitor input to the MCD, e.g., from any sensor on the MCD, e.g., rear-facing camera 614, forward-facing camera (not shown), flash/flashlight (not shown), microphone 616, accelerometer 618, and also from any connection to the MCD, e.g., Wi-Fi or other connection such as 5G. Guide 610 may also have access to the control of MCD output, e.g., display, speaker, haptic device, flashlight, and mobile connections. Both the virtual feed and actual feed may include audio and video components.

Thus, in embodiments, guide 610 is able to determine differences between the virtual and actual content that is provided to the user, analyze the differences, and modify output from the MCD based on the analysis. In embodiments, the modification may be a visual, audio, or haptic event. A visual modification may include an addition or removal of a feature on the display. Similarly, an audio modification and haptic modification may include an addition or removal of a feature in the respective feeds. Thus, in embodiments, guide 610 may filter out or add to the content received by the user. Also, in embodiments, some or all the features of guide 610 may be implemented within a network accessible by MCD 612.

In embodiments, guide 610 may modify the content received by the user for reasons including, e.g.: to enhance the user's safety and to enhance the user's knowledge. Guide 610 may enhance the user's safety by bringing to the user's attention aspects of the user's environment that may be dangerous or provide risk, such as: warning signs and changes to or obstacles in a user's path. Guide 610 may enhance a user's knowledge by accessing and displaying content that may not be readily apparent to the user, e.g.: accessing and displaying data based on camera input (such as a QR code, or performing facial recognition), accessing and displaying data based input from a network connection (such as a video feed from a network-enabled security camera).

In embodiments, the features of guide 610 may be implemented in the OS of MCD 612, or in an application executed by MCD 612, or as a security layer, or safety layer, or set of APIs in MCD 612. In the discussion of guide 610, MCD 612 is merely representative of client devices that may be used for XR implementations. It should be understood that guide 610 may be implemented in any such device.

In embodiments, guide 610 may perform the following modifications of the output of MCD 612 to, e.g., improve safety or otherwise enhance the user experience:

Detect, evaluate, and prevent the presentation of (either completely or by moving to a "safe" region), virtual elements (visual and/or audio), which includes moving the element to a different part of the display or adjusting the size of the element so that it does, e.g., obscure an important real element.

Adapt the presentation of virtual elements based on the detection and evaluation of real elements, e.g., visual and audio. For example, upon the detection of sirens, vehicle engine noise, or shouts, aspects of the XR presentation could be reduced or eliminated to allow the user to address the real event.

Add enhancements to the display to highlight real elements, such as adding an outline to a car door that may swing open, or adding yellow/black stripes to stair steps or curbs, or adding flashing "warning" signs to objects (such as moving vehicles) or conditions (such as wet floors).

Modify the presentation of physical warning signs to be more understandable, e.g., magnifying, highlighting, or re-aligning a sign so that it is more visible, or legible, to the user.

Adding haptic or audible alerts along or in combination with visual enhancements.

Adding indications of safe zones, such as a virtual "yellow brick road" indicating where the user may safely tread.

Adding indications of danger zones using, e.g., diagonal striping to suggest avoiding the area, or highlighting signs (after determining their meaning), such a "beware of dog."

Modifying the audio to, e.g., allow the user to hear the environment, by, e.g., turning off virtual audio, or turning off noise cancellation.

Alerting the user to a detected real event by accompanying the event with an alert, such as a startling visual and/or auditory stimulus to grab the user's attention.

Detecting movement or change of a real object in a composited XR scene and adjusting the display to increase the visibility of the real object by, e.g., suppressing the XR component, moving an XR component, or providing for the real object to bleed through the XR component.

When MCD 612 is displaying a 3D space that extends virtually beyond the actual physical (or safe physical) bounds of the user's space, adding visual elements to the display to inform and prevent the user from moving into an unsafe area of the real world.

When MCD 612 is displaying a 3D space that extends virtually beyond the actual physical (or safe physical) bounds of the user's space, removing virtual elements to show the user the real space.

In embodiments, the user may be provided with the ability to view current sources of input (e.g., video, audio, and haptic) and mix adjust the inputs.

In embodiments, guide 610 may be governed by rules or policies. For example, the actions available to guide 610 may change depending on, e.g., the environment of the user, the time of day, a geographic location, and the like. Such rules or policies may be generated by the user, or by an administrator, e.g., an enterprise administrator. Such policies are discussed further within. In embodiments, instead of the user viewing a mixed reality/XR space on the MCD 612 the user may be viewing it using augmented reality glasses or a head mounted device which affords the monocular or stereoscopic viewing of the composite mixed reality/XR space which includes real world content and computer generated content in a combined fashion. This may also include smart contact lenses capable of creating images viewable by the user. Where there are discussions of the MCD 612, any of those embodiments equally apply to any of the types of devices mentioned above.

Content Acquisition

In embodiments, guide 610 may manage the acquisition and presentation of content. Such content may be virtual, such as filters that overlay animal faces on people, or they may be informative, such as content accessed from the processing of a QR code from a camera image. For example, without management by guide 610, processing a QR code could lead to the display of inappropriate virtual or real content, just like clicking on an inappropriate link would in a web browser. Thus, guide 610 may have access to databases of content source, such as domain names and Wi-Fi hotspots, that guide 610 may consult to determine whether to present content from a source. Furthermore, certain content may be appropriate for guide 610 to allow in certain conditions, e.g., when the user is seated.

Thus, in embodiments, guide 610 may have the following optional actions regarding the acquisition of content:

On the detection of nearby content, e.g., via Bluetooth, Wi-Fi, or visual detection of a QR code in a camera image, guide 610 may permit the acquisition and display of content from the detected source. Thus, other devices could supply virtual content that guide 610 could permit to be displayed or integrated into the display of MCD 612. Such content could include, e.g.: avatars or cosplay costumes to be overlaid on real persons.

On detection of nearby content, guide 610 may allow MCD 612 to establish ranging and a connection to, e.g., a second device, or from a cloud source, e.g., a Wi-Fi router, for acquiring and rendering content. Such connections could use, e.g., IEEE 802.15 ranging for more precise ranging and positioning of content, or LiDAR (Light Detection and ranging), or any other method for determining a 3D point cloud of part or all of the user's environment.

Policies

In embodiments, the actions of guide 610 may be governed by rules or policies. Policies may have hierarchies such that one prevails in case of a conflict. Policies may be generated by the user, or by an administrator, e.g., an enterprise administrator, a user's guardian, an owner/operator of the physical infrastructure in which the user or enterprise is occupying space (e.g., a building owner, etc.), or any combination thereof. The policies may be applicable to a user, for any device the user may be employing, or could be specific to a particular device or type of device. The policies may be applicable only in certain real world locations, such as an enterprise's manufacturing plants. The enterprise administrator may deploy such policies to a fleet of devices for application. Thus, in embodiments, guide 610 may determine differences between the virtual and actual content that is provided to the user, analyze the differences, determine if a policy is applicable, and modify output from the MCD based on the analysis and in accord with any applicable policy. Such policies may include:

- A priority that the presentation of real, safety-related objects or events take precedence over the presentation of virtual elements.
- A policy to enhance the user's awareness of safety-related objects or events upon the guide's detection of the object or event.
- A policy to display a safety notification (e.g., an enhancement of a boundary, or a displayed notification) upon the detection of a relationship to a safety-related area, such as the nearing, entering, or leaving of an area.
- A policy that upon the detection of public safety or health concern (e.g., obstacle on roadway or sidewalk, trash, excrement, syringe, other potentially harmful object or condition such as flooding) guide 610 initiates the broadcast of a notification to an appropriate agency.
- A policy that limits a spatial extent of virtual content in, e.g., size, locality, or direction.
- A policy that signs, or categories of signs, are to be enhanced for the user, where enhancing includes: magnification, modifying text to be clearer and easier to read, overlaying an improved sign on top of an obscure sign, re-orienting a sign, e.g., to be viewed head-on instead of at an angle, translating into a language known by the user, and adding visual emphasis (particularly if the text is safety related).
- A policy may be configured such that guide 610, in following the policy, overrides functions of other applications on MCD 612, such as, e.g., an OS, firmware, display application, and audio applications.
- A policy may define items or areas in the real world that the XR display manager is not allowed to obscure.
- A policy may be that exceptions may be defined to one or more other policies. The exceptions may relate to, e.g., things like a pet (cat, dog), or other unpredictable and innocuous real elements, and the exception may be that the occurrence of the exception is not to be a trigger to one or more other policies.
- A policy may be that for a defined geofence, the geofence is to be monitored for any change of objects or sensor readings (e.g. temperature) within it. Deviations within the geofence, e.g., changes of object positions, changes of temperatures, changes of light levels) may be triggers that cause guide 610 to initiate an action according to the policy (e.g., the presentation of video, audio, tactile/haptic, or olfactory, elements, or even with the right hardware, gustatory or vestibular elements).
- A policy may be that XR sessions are to be recorded and stored automatically.
- A policy may be that, prior to initiating an XR session (which may include donning or activating equipment or starting an app), a geo fence is created (either by guide 610 or the user) where the user may go without interruption or warning or cessation of the session. The user straying outside the geo fence may then be a trigger for an action by guide 610, e.g., an action that modifies or exits the XR session.
- A policy may provide that guide 610 excludes or prioritizes input. For example, a policy may control whether or when a input from a certain content provider or a certain sensor input is allowed. The policy may constrain the times such input is allowed. The policy may constrain the physical locations such input is allowed. The policy may constrain the physical conditions (e.g., altitude, velocity) during which such input is allowed. In general, policy may be specified by the user or others, and may control XR presentation during activities, at certain times or locations, access by applications to sensors, access by applications to output/displays, and may control the input of content, including what content or types of content to be blocked, allowed, and/or modified.
- The management by guide 610 of content acquisition and content display may be based on policies that provide conditions governing the acquisition and presentation of content. The conditions may be based on the source of the content, or on the actual content itself
- A policy may control what XR constructs are available to whom.
- In embodiments, XR content from multiple sources may be available for sharing with device 612 for incorporation into a composite display. A policy may control what sources may contribute. The policy may be based on security and privacy considerations, such as: enterprise considerations (to allow or disallow XR content not expressly on a "good" list or from sources of ill repute), trust levels of the sources, context (e.g., current task, geolocation, connected network). The policy may allow the presentation of content only from sources with trust levels above a pre-defined threshold, or at the greatest possible trust level. When a trust level is below an acceptable threshold, the policy may allow for a reduced version of the proffered contribution from the source. The policy may provide for notifying the user of an alternate source of the contribution. The policy may be based on user preferences as to what sources of XR content the user finds desirable.
- A policy may be based on a determination that the user is driving, e.g., via a speed indicated by a sensor or a signal tracking application, or via a wearable detector of steering wheel interactions, or by an accelerometer registering shifting, or braking, etc.
- A policy may be based on a determination that the user is walking or running or moving in other ways, e.g., on an escalator, riding a bicycle or other wheeled vehicle, e.g., via a speed indicated by a sensor or a signal tracking application, or via a wearable detector of visual observations and learned models of types of locomotion from accelerometers and gyroscope sensors.
- A policy may allow user modification or partial user modification to the policy, e.g., the policy may allow user modification in certain conditions, such as the user being stationary, but not for other conditions, such as the user travelling above a certain velocity or otherwise determined to be walking or driving a car or moving in some other manner.
- A policy may prevent the presentation of content when guide 610 determines that, based on the proffered content and real world conditions, that the presentation of the content may precipitate a safety or security event.

That is, the presentation of the content may cause the user to react in a potentially harmful manner. For example, the policy may specify that, unless the user is both stationary and in a "safe place" (as opposed to being in the real world (on a sidewalk, for example)), guide 610 is not to allow virtual content with imagery of threats that could result in an involuntary user reaction where the involuntary reaction may result in user injury. In other words, for content such as an oncoming vehicle, attacker, or monster, the policy would require the user be stationary and housed, so that an involuntary physical action such as running away would not put the user in danger of being injured.

A policy may provide that when guide 610 is accessing information, guide 610 is to obscure information that may be personal. For example, when guide 610 is accessing a network-enabled camera that may take images of people, the policy is that guide 610 is to obscure the face of people in view of the camera. This policy may be set by the source of the information. Thus a restaurant that allows access to an internal camera for the use in determining a waiting time or crowd level, would not be disclosing who the patrons were at that time. Similarly, a line to a restroom could be accessed without disclosing the identities of people in the line. Obscuring an identity may include rendering a person translucent, or modifying their appearance, or even rendering the person transparent (e.g., when the camera is being used to browse the merchandise in a store).

A policy may be that guide 610 communicates a requirement or request that recording devices enact privacy measures required or requested by the user. The privacy measure may include that the recording device obscure the user in some manner.

A policy may relate to the privacy of external persons. The policy may be that guide 610 broadcasts an alert when recording external images. The policy may be that guide 610 must receive a permission associated with an individual or object (e.g., piece of art) to record images or audio from that individual or object. If permission is not received, the policy may direct guide 610 to obscure the recording of the individual or object. The permission may include a limitation, e.g., the inability of the user to re-transmit the recording, the requirement that some or all features of the person or recording are obscured. The permission may be communicated to guide 610 in the form of a signal or gesture from the person, or a sign associated with an object, e.g., a QR code may encode a limited permission to record a work of art. The policy may require that a person's or object's privacy indications or protections override any guide 610 setting, except in certain situations, such as the user declaring an emergency. In such an exception, guide 610 may, e.g.: broadcast an emergency signal to devices or emergency public services such as police medical fire agencies. The broadcast may be made via any method, such as Bluetooth, Wi-Fi, cellular, 5G, D2D, audio (including subsonic and supersonic), and visual (including infrared and ultraviolet light). The policy may direct guide 610 to initiate a communication (e.g., via cellular, Wi-Fi, 5G, or D2D), with a representative or service.

In a policy, some XR visual or audio content may be accessed and/or displayed only to a subset of users base on rules and policies governing the authentication (AuthN) or authorization (AuthZ) of the user and/or device. For example, a policy could require AuthN or AuthZ for content from a speaker, and, upon guide 610 recognizing the speech of the speaker, the policy may direct the censoring of the content from the speaker or the substitution of content for the speaker's content.

In a policy related to teacher/student scenarios, the teacher may control certain objects in an XR display and the student may have permission to interact with other objects, but not the teacher-controlled objects.

In a policy related to XR content sharing and trust, content may be shared to device 612 from a second device, such as a model from an internet-of-things (IOT) enclave hub. An issue may regard how to authenticate that model, e.g., verify that it is true and accurate. In an embodiment, signed assertions of trust from other users may be included with the model. The related policy may require that the assertions be received along with, or in advance of, the model. Standard encryption methods may be used to authenticate the assertions. For example, if policy requires assertions from trusted sources, this may be accomplished using cryptography to supply a list of trusted sources without exposing the contents of that list to the assertion provided.

Policy Triggers or Conditions

A policy may include one or more triggers or conditions than cause guide 610 to modify the presentation of virtual elements according to the policy. Modifications to the presentation may include, e.g.: removing, repositioning, or changing size or color of a virtual element; changing volume or apparent 3D location of audio; blanking a display A trigger for any particular policy may include guide 610 detecting an event, where an event may include, e.g.: a safety notification, a hazard, a warning, a user or administrator-defined event, entering or leaving a geo-location, a scream, a cry, a tea kettle whistle, a doorbell, a phone ringing, a siren, a fire alarm, a clock alarm, a voice, a moving person or object on a trajectory to impact the user or a pre-defined region around the user or where the user's own trajectory is likely or possible to take the user, etc.)

A trigger or condition for a policy may be a current user state. For example, for a user sitting in a chair, some things may be allowed to be obscured, but for a user standing or walking a different policy in place that does not allow those same things to be obscured.

A trigger may be the occurrence of a particular real-world event, upon the notification of the event guide 610 initiates a policy. The real-world event may include, e.g., seismic activity, a weather alert, a change in temperature, a change in light level, a drop in barometric pressure, and an Amber alert.

A trigger may be provided by data from any connected sensor, where the connection is wired or wireless. For example, movement detected by an accelerometer toward a hazard may be a trigger for a policy associated with the hazard. Similarly, the sensor data may indicate, e.g.: seismic activity, a weather alert, a change in temperature, a change in light level, a drop in barometric pressure, an Amber alert, and sensor indications of possible imminent movement, including nerve signals or brain signals which may precede motor actuation in the human's body.

Guide 610 may consider as a trigger, e.g., of a safety event, an input from a sensor (e.g., an accelerometer, camera, gyroscope other sensor). The input may be analyzed and interpreted to be a safety-related event, such as a fall, collision, severe jostling. Guide 610 may then determine that a policy applies to the situation and modify the XR presentation accordingly, e.g., by suspending the presentation. In an embodiment, the policy may direct guide 610 to initiate an alert of an outside source, or to begin recording data from available sensors so that the event is recorded.

XR Enhancements

In embodiments, in addition to modifications to the XR presentation to enhance safety, guide 610 may modify the XR presentation for other reasons, e.g., to inform or instruct the user. Features of provided by these embodiments may include the following:

- Guide 610 may modify the XR presentation to compensate for user disabilities, such as color blindness or hearing loss. For example, the user may inform guide 610 of colors the user cannot detect and guide 610 may alter such colors to a detectable color. The user may inform guide 610 of such colors by taking a test provided by guide 610. Also, the user may inform guide 610 of frequencies that the user has difficulty hearing and guide 610 may alter such frequencies to make them more detectable (e.g., raise their volume), or guide 610 may change the frequency of an input to be output at a different frequency that is more detectable by the user. In at least one embodiment, when a user is colorblind, guide 610 may alter a color in the XR viewspace to allow the user to see the object (or contrast against other objects.) In an embodiment, the AR system can enhance the viewing to allow a legally blind person (e.g., vision is 20/200 or less in one or both eyes) to see an item, e.g., by enlarging the item, or lighting the item. Thus, guide 610 may help in reading distant signs (via magnification, or using OCR and providing an audio narration.
- Guide 610 may highlight real world markets, QR codes, or recognized objects and offer to access and provide information related to the market, code, or object. Such a feature may be used for advertising—basing the advertising revenue stream on the recognition by guide 610 of the real-world object, similar to a revenue stream being based on a click on a link. Such a feature may be used to access information about an establishment. For example, when is the restaurant open or what is the wait time, what is the daily special, or is there a coupon? Guide 610 may provide an option to access a reservation system such as Opentable. Guide 610 may access meeting room information and provide vacancy information. Guide 610 may modify the XR presentation to provide directions to a location, e.g., using an icon or line to follow, or providing directions on when to turn and related distances.
- Guide 610 may provide for modifying the XR presentation according to a theme. For example, a theme could be that all people have an overlay that makes them look like a fictional character, e.g., movie, a comic book, or science fiction character. The theme may also be applied to physical features, such as buildings and vehicles. Such a provision is similar to what CSS does for webpages, there would be the ability to define an alteration of any visual appearance aspect, including brightness, hue, perceived material surface appearance, etc.
- Guide 610 may access training information and modify the XR presentation to provide training for skills. For example, the presentation could be modified to shown the user how to chop vegetables, debone a chicken, or walk a user through a recipe step-by-step. For example, in modifying the presentation, guide 610 could provide a set of virtual translucent hands and tools where the user it instructed to follow the translucent hands and tools with the user's own real hands and tools. Similarly, guide 610 could instruct the user how to practice kung fu or lead the user through a weight-training session. In such presentations, guide 610 could provide feedback in the form of visual, audio, or haptic signals when the user gets close to or achieves a correct position. Similarly, guide 610 could modify the presentation to show where the user needs to modify their position to achieve the instructed position, e.g., by adding a highlight to the depiction of the user's hand, or the section of the user's hand that needs to be adjusted to achieve the correct position. Thus, enterprises may employ embodiments of guide 610 to provide training sessions in which the user is walked through a procedure step-by-step and corrected in the process.
- Guide 610 may be employed to help the user be more situationally aware in the real or virtual world. For example, games or simulations may provide training in which the user becomes more adept at identifying, e.g.: eavesdroppers; on-lookers; people following or tracking; surveillance cameras, safety issues (e.g., such as those associated with vehicles and traffic, or the need to check certain directions when crossing a street, or the need to pay attention to a step or gap).
- Guide 610, may recognize an activity or a location and provide to the use a personal reminder regarding the activity, e.g., not to perform it, or not to enter the location, or that the user's weight training session is scheduled that day, or to refrain from entering the shoe store because the user's budget has been exceeded, or that the user had an item on a shopping list and guide 610 has recognized it in an image, or determined that a nearby store sells the item and guide 610 may guide the user to the item within the store. Guide 610 may guide the user through a store in the most efficient route to acquire items on a user list.
- Guide 610 may detect identifiers of things or people from a camera image and offer related info retrieval. Such retrieved information may be presented to the user in the XR display with a viewspace cursor and audio narration.
- Guide 610 may perform facial recognition and modify the XR presentation to attach information regarding the person, e.g., name, role, organization, preferences or other attributes, or recent communications. Such reminders may be associated with a policy that requires permission from the user to present, or permission from the recognized person to present. Guide 610 may be required by a policy to request permission from the recognized person before presenting the associated information from the user, or to detect a broadcast privacy policy from the observed person and to comply with said policy.
- Guide 610, after accessing information regarding a recognized person, may modify the XR presentation to suggest topics to discuss with that person. The suggestion may be made after Guide 610 also accesses information regarding the user and correlates user information to the person's information. Thus, the suggested topic may meet both people's interests, such as a hobby, travel destination, or award or recognition.
- Guide 610 may function as a backup for the user's personal memory. In addition to the facial recognition feature, guide 610 may be requested to remember attributes of a physical location. For example, guide 610 may be instructed to remember a room and later to inform the user if the room is somehow different, e.g., an object has been added, an object removed, an object moved, or an object replaced with a different object. Thus, guide 610 may discern a mark left by a first person to inform the user, e.g., that mail has been picked up or delivered.

Guide 610 may access network-enabled (e.g., Wi-Fi, Bluetooth, or Cellular) cameras and microphones in, e.g., vehicles, rooms, or other XR devices, and modify the XR presentation to present images or audio. For example, images and audio from household child monitors may be accessed and presented. Weather cameras may be accessed to see, e.g., ski conditions. Security cameras may be accessed to ensure that doors are properly closed. Restaurant or cinema cameras may be accessed to check waiting lines. Stores may be browsed remotely using store cameras. The images and audio may be modified or enhance, e.g., an image from a camera may be re-oriented to reflect the point of view of the user—in this way a user may be provided with a form of "x-ray" vision into a room equipped with a network-enable camera.

In accessing network-enabled cameras, guide 610 may enhance, e.g., the viewing of sports or entertainment. For example, guide 610 may modify the XR presentation to: display the first down and ball placement lines; display player identification and current statistics; display actor or character names near actors in play or video; and display dialogue visually of athletes or actors in speech balloons or other similar display means.

Guide 610 may associate audio XR content with a particular spatial location, such that the audio content sounds as if it is coming from that location. Thus, the user may turn their head and experience the direction of the sound changing as well. Similarly, guide 610 may modify the presentation of the sound to correspond to a distance from the spatial location, such that the sound changes as the user nears or recedes from the source.

Guide 610 may be directed by, e.g., a user or administrator, to record and playback real content or XR content, e.g., for review or reporting.

Guide 610 may enhance a performance by overlaying XR content including special effects and/or sets or scenery on a traditional performance using 5G, D2D, or other peer or traditional communication to obtain additional XR content from a nearby source of content. E.g., a theater may present a play in which the scenery and costumes are perceivable only when using an XR device, affording greater flexibility in appearance, scenery changes, while eliminating the cost of physically constructing sets and creating costumes.

Similar to the "x-ray" vision, guide 610 may receive content from sources that have better angles or higher resolution and guide 610 may integrate and filter the received content to provide a view of the content that is better than the view available to the user otherwise. The improved view may be the result of the additional sources being spatially separated such that, when combined, the additional sources provide a binocular or n-ocular view of the target content. In addition, the multiple sources may be combined to provide a 3D view of the content. Furthermore, guide 610 may provide the user with the apparent ability to move in 3D even though the user remains stationary.

Guide 610 may provide the user with an option to adopt a particular viewpoint in an XR presentation, such as a viewpoint associated with a moving object or person. For example, the user could select a viewpoint from behind a quarterback or wide receiver. The viewpoint, in a 3D XR presentation, may create an artificial immersive experience as though the viewer were on the field following the player.

Thus, in an embodiment, guide 610 provides the ability to receive content from multiple sources and create a composite XR presentation with the multiple sources but from the single viewpoint of the user. The received content may include different categories of content. For example, environmental AR ("E-AR") may include things that are displayed as and intended to be part of the external environment. These may be sessile (unmoving, e.g., rivers) or motile (e.g., mountains). They may be anchored in an environment shared by the user with others. Personal AR ("P-AR") may include objects anchored from the user's position and/or orientation. In such a situation, it may be a question of who renders the XR object (XR-O), or who controls the visibility of the XR-O. For example, a capture of part of the real world at a time, place, orientation, and scaling may be displayed as an XR-O (think video virtual conferencing). External environment object (EE-O) an external environment object that appears in the E-AR. An EE-O may be a real (EE-O) or virtual (EE-OV). Safety rules about whether any AR-O can obscure an EE-OV. Environmental objects represent things that are intended by the creator of the environment, e.g., an artist for a room used for viewing an art display or performance, or a person who owns or controls a room, e.g., specifying this is the appearance the person wants the room to have when perceived by anyone with an XR viewing device in that physical room, like the wallpaper, drapes, floor and wall and ceiling appearances, perhaps a changed appearance for a physical object in that room, or a virtual object to be placed within the XR display as though it were a physical object in the room. Such environmental objects can be used for aesthetic reason, or to facilitate training experiences, or for entertainment reasons, etc.

In an implementation in which video conference participate in a virtual conference while wearing a head-mounted display (HMD) XR device that obscures the user's face (e.g., a Microsoft Hololens), the use of the HMD would obscure the faces of the participants in the presentation of the XR conference. In an embodiment, in advance of the conference, guide 610 may be provided with an image (still or video) of the user (e.g., guide 610 may provide an audio or visual request of an image of the user directing the user to use a camera associated with the device). Optionally, guide 610 may use a user-facing camera to take a user image as, e.g., the HMD is being put on. Guide 610 may then provide the image to the participants and receive images from the participants in turn. While each user is participating in the XR video conference via an external camera taking their image, guide 610 may then compose the XR videoconference using the provided attendee videos in place of the HMD-obscured faces.

In a variation there may be real world display surfaces physically situated about the room with the user. In this variation, the user does not wear an HMD but just sees the other participants on these displays. Similarly for other AR virtually displayed objects to appear on some other displays. The room may have sensors which determine the location of the user in the room and modify the imagery displayed on the devices depending on the user's location, e.g., to simulate the appearance that the physical display surface is a window in the three dimensional environment of the participant who is being displayed.

Optionally user may wear a camera only HMD (without stereoscopic displays) to provide video from the user's point of view while one or more displays visible to the user may provide a view similar to what the user would see if the user were actually wearing an HMD. For shared XR-O objects, there may also be a display that is "see through" (e.g., actually looked through, like a transparent LED display, or virtually looked through, like a tablet display with a camera) that user may hold up and which displays the superimposed XR imagery. An example is a virtual object viewable by participants only when the participant is viewing that region of the physical space virtually "occupied" by the virtual object using such a transparent display, which renders a display of the virtual object and the real room, composed as though the object were physically in the room with the participant.

In composing a XR video conference, guide 610 may place virtual participants in positions that do not obscure real world participants. In such a conference, guide 610 would enforce, as much as possible, a common relative positioning for all participants so that, e.g., glances left or right make sense to all viewers. In this example, the guide 610 may be communicating and cooperating with other such guides 610 associated with other participants.

Guide 610 may compose an XR presentation, such as a videoconference, using any real surface as an XR "whiteboard." That is, positioning XR content on the whiteboard so that it does not obscure real content.

Guide 610 may share group content with, e.g., any device associated with the collaborating group; any device within a certain proximity range; or any AuthN or AuthZ device.

Guide 610 may capture the group content as, e.g.: strokes for later rendering as vectors; or as a 3D whiteboard, which may be persistent or not, e.g., the content may be recording and retained, or the content may only be viewed while a person attends the videoconference. For example, a person physically drawing upon a physical whiteboard may be observed using camera(s) associated with the Guide 610 to detect the drawing motions and the observed resultant text or drawings on the whiteboard, and determine as time-stamped vectors the drawing motions. This would afford the later playback of the whiteboard appearance as it changed over time, without the person drawing being part of the picture, possibly obscuring a part of the whiteboard drawing.

Guide 610 may modify the presentation of a teleconference to: (1) display the conference as 3D environment, with XR content placed so as not to obscure things for safety; (2) place participants such that they are aligned with, and at apparent visual distance, so as to appear to be on a wall or table surface (e.g., a flat surface), and parallel (if a wall) or perpendicular (if a table) to those surfaces; (3) send to another user info regarding which subset of objects in first user's view that first user wishes to share with second user (such object information may include an object position, so that both users will perceive it as being in the same physical location); and/or (4) provide associated authorization and/or authentication to allow another user to see these things, which may be shared. In a teleconference, guide 610 may share some objects that will be inherently 3D objects and include both a location and an orientation, other objects will be 2D and oriented to always appear to face each participant, although the location of the 2D rendering may be shared, still other objects may be shared, but each individual user may be allowed to re-position, re-size, or re-orient them as that individual user wishes.

Guide 610, when modifying an XR presentation to include additional content, may modify the content to improve the user experience. Such modifications may include any aspect of the content, e.g.: color, brightness, contrast, size, placement, orientation, transparency, or whether to include the content at all. Similarly, guide 610 may modify what is included in the XR presentation from the real images acquired by a device camera. Such modifications may include, e.g.: an object border, a change to a surrounding area (e.g., when guide 610 detects an unsatisfactory contrast), repositioning, rotating, resizing, skewing, or otherwise transforming the virtual display so as to reduce the contrast problem, or improve the visual satisfaction/readability measure/metric.

Guide 610 may use the geometry of other real or virtual content as alignment points/lines/planes of reference for the positioning of virtual content, e.g., in a "snap-to" mode in which virtual content snaps to a local geometry. Such content may later be altered by the user, e.g.: moved, transformed (resized, repositioned, rotated, skewed, perspective-transformed).

When in a "browsing" or "Scrolling" mode, guide 610 may use the almost infinite available space around the user to keep representations of content. Content that is currently in use (in some way) may be indicated by a visual and kept centered, but other content may be allowed to scroll past the in-use content. The scrolling may be in an arbitrary direction. The scrolled content may be made to appear different from the in-use content, e.g., reduced in size, or changed in transparency, color, or contrast.

When scrolling, following a link may shift a previous current content to a side and present the content from the link at "center stage." A "scroll ahead" mode may be supported in which parts of the page not yet scrolled to are shown below the center stage. When scrolling, a tree structure may be supported for future browsing in which thumbnails or scroll columns of other pages are shown to the right of current scroll column. Aspects of the potential content may be depicted in less detail to assist the speedy rendering of the tree, e.g., for animations or video, a static image may be presented; objects or videos may be re-oriented A user's specification of attributes for visual display may be applied to such objects and images, in a manner similar to how CSS is used to specify the visual appearance of HTML elements in a webpage.

Spatial Anchoring of Virtual Displays

In embodiments, a user may select a location in the real world (such as a wall, an appliance like a refrigerator, a wall adjacent to a thermostat, a piece of paper or a magazine, a garage, a car, etc.) on which position an XR presentation (e.g., from guide 610, an application, a web browser, a document, a VDI display from a different device, etc.) In such an embodiment, when the user wearing an XR device glances at a spatial anchor the user is provided with an XR presentation associated with the anchor. The user may then interact with the XR presentation using, e.g., voice, gestures, virtual keyboard typing, etc. Such spatial anchors may persist so that at a later time, the user may view the spatial anchor and re-acquire the XR display (either automatically upon guide 610 recognizing the spatial anchor, or after guide 610 prompts the user as to whether to re-acquire the XR display).

Spatially anchored virtual displays may also be shared with others via person-to-person or other communications and with various levels of permissions and associated need for authentication and authorization. In an embodiment, an external service may be used to register a spatial anchor and to support discovery by other users of spatially anchored virtual displays. Such spatially anchored virtual displays may be used at, e.g., a museum with individual pieces each having an XR presentation anchored to the piece.

Features of Spatial Anchors May Include:
- Being made public so that any XR viewer can detect such a spatial anchor and view the presentation.
- Being part of a subscription to a set of spatial anchors. The subscription may include wayfinding directions to other spatial anchors, e.g., for creating a virtual XR tour of a physical space.
- A spatial anchor can be attached to a particular object, like an appliance dropped off for repair so notes by the appliance user can be viewed by a repair person viewing the appliance.
- XR displays that are spatially anchored may also be viewed by the owner or a permissions user when user is in a different location.
- The XR system, e.g., guide 610, may recognize particular instances of objects or classes or categories of objects, and such a recognition may represent a semantic anchor. That is, other XR content may be associated with the semantic anchor and become part of the user's XR display.
- The XR system, e.g., guide 610, may OCR text in images from the device camera or XR presentation and, as discussed, may enhance it for user. That text may contain keywords or phrases that act as semantic anchors that prompt the display of related XR content. Such anchors may act in a similar way to spatial anchors, including the ability to do permissioned sharing, etc.

There are systems that perform 3D mapping of objects and surfaces near the user, and such 3D mapping can facilitate the positioning of XR objects in the composite XR display space, but the user may not want every device doing the mapping all the time. Other devices previously in the physical environment may have already done some mapping. A device newly in such a space may obtain the mapping information to use what has already been done and add to it by doing more mapping of greater spatial expanse of adjoining or embedded regions of *incognita* or finer level of detail. The existing mapping information may have a physical anchor in the space, e.g., a QR code which specifies the network location of where such mapping information exists or can be added to. Or the user may have the location of such a source of mapping information available via another network source The display resolution of a user's XR viewing device might have limitations in what level of spatial resolution are useful for it; the external source of such mapping information can serve different levels of resolution of the model to different users or device's based upon various criteria specified by the user or the device. The availability of the mapping data for particular resolutions may vary depending on a user Authentication or where the user has purchased a premium level of mapping resolution.

As XR becomes more popular people will want to use it in places where no video and or audio recording is allowed. It then becomes a question of how to allow XR enhancements to be used while guaranteeing that no recording is allowed. In embodiments, on entrance to or within such spaces that include signs (e.g., QR codes, network-accessible instructions, or text signs) saying no video or audio recording allowed. The guide 610 recognizes such signs and may activate a non-overridable security mechanism (except via other special permissions which may require user authentication and access management rules) that enforces a prohibition on recording while in that space. In an embodiment, devices in such space may be required to be discoverable such that an associated security system may interrogate a discovered device regarding the device's security posture and obtain a cryptographically-signed attestation that the security recording ban was detected and is in force. The security system may then provide an alert if a discovered device does not indicate compliance. Furthermore, the ability of a device to comply may be tested before entry of device to such a room or space. If it does not indicate such a capability then the external security system may not allow said device entry to the space, or may alert an administrator to the situation. In embodiments, the requirement that a device be discoverable by a security system as described above may be for any sort of device, not only just an XR System, but any device that may record audio (including subsonic or ultrasonic) or video or RF, or receive and re-transmit such signals. In an embodiment, a user may, based on preference, have configured a device so as not to comply with external triggers that prohibit recording or retransmission, but in the embodiment, the user may not configure the device to misinform the security system regarding the device's state. Thus, if such a device is configured to comply and is allowed entrance to such a space then, in the embodiment, it will not be able to be reconfigured while in such a space. In an embodiment, the device may be reconfigured for special situations with an associated notification of the security system, e.g., in an emergency situation the device may be reconfigured to record or retransmit, which will also result in an alert of the external security system to the emergency situation and reconfiguration. In an embodiment, the declaration of such an emergency situation allows for a reconfiguration that only allows recording or retransmission directly to the external security system. The security system may continue to block, but may raise its own alerts.

Hand Gestures for Virtual Interaction with Virtual Displays

An XR user may use various hand gestures to interact with virtual displays, to click, to select (e.g., ranges of text), to input text, etc. by using different configurations of the hand for different predefined actions. For example, any configuration of the hand can have a different associated action. The index finger pointing may be a first action. Any other finger pointing, the whole hand as a blade, a combination of several fingers, such as the index and little fingers raised, etc., may be associated with other actions. A "thumbs up" could be associated with a "like" for a social media post viewed on a virtual display. In embodiments, gestures can be detected visually by cameras in communication with the guide 610, or by other sensors, such as smart gloves containing sensors which relay the position of the hand and individual fingers, etc.

In embodiments, in XR presentations, such gestures may be used to interact with real world content, e.g., printed text, selecting text, searching selected words, following printed URLs, etc. A gesture can be recognized by guide 610 and associated with any arbitrary command, such as a command to OCR a page, rectify it for viewing as a new virtual display (or on an existing virtual display), to select, click, copy text, follow links, take notes (voice or text), etc.

In embodiment, gestures may be created using any user movement or audible sound, or combination of movements and audible sounds, e.g., a movement of: a limb, hand, finger, eye (wink), and face. In an embodiment, gestures may be used to interact with virtual or real content in an XR display. In an embodiment, a user interface may be presented in an XR display and gestures may be interpreted by guide 610 and used to interact with and command the user interface. In an embodiment, the user interface may be displayed in an HMD or HUD. For example, a gesture may interact with an icon to access an application, e.g., an application providing a virtual keyboard.

In an embodiment, guide 610 may interpret a gesture to be directed to a particular real or virtual object. Thus, guide 610 may provide for the use of multi-channel gestures, in which a gesture toward a particular object may be combined with a second gesture or audible command regarding the object. For example, a gesture toward a light may be combined with a simultaneous command "dim the light" or a subject gesture that guide 610 interprets to "dim the light." Thus, in embodiments, an initial command may provide context for a subsequent command. In embodiments, guide 610 may access information regarding surrounding devices that may be controlled, e.g., determine nearby IoT devices that may be commanded. Thus, in embodiments, the available devices to control may provide context for the meaning of a command. In an embodiment, a gesture may be recognized by guide 610 accessing and interpreting input from camera 614. In an embodiment, a gesture may be recognized by guide 610 accessing an input from an external camera. In an embodiment, the image from the external camera may be displayed as virtual content by guide 610 on display 624.

In an embodiment, one or more gestures may be used as an authentication. In an embodiment, one or more gestures may be combined with a recognition as an authentication. In an embodiment, the recognition may be of an object, collection of objects (e.g., a room), and/or a face or facial feature.

In an embodiment, for repeated gestures a user may tire of making the repeated gesture, i.e., the user may tire of holding their hands up. In the embodiment, a user hand gesture may be used to control a virtual "cursor" that the hand gestures may interact. The virtual cursor may then be used as a substitute for the hand gestures that the user found tiring—similar to using a mouse on a desktop to control a cursor on a display.

In an embodiment, a gesture may be used to confer privileges to a different user. For example, a virtual pat on the back of a co-attendee at a virtual teleconference may confer control of a presentation to the co-attendee. Similarly, in an embodiment, a gesture may be understood to indicate a "next" user, e.g., the gesture may indicate the passing of a baton of sorts.

In an embodiment, one or more users' abilities to provide input by gesture may be limited, e.g., by a policy associated with the user(s). For example, guide 610 may be directed to not recognize gestures from a particular user (e.g., as determined by facial recognition or sign-on credentials). The prohibition may be included in a policy. The prohibition may have conditions, which upon being met, the policy is terminated, e.g, a special gesture may be made, such as an apologetic gesture.

In an embodiment, a policy may control when guide 610 may act upon a particular gesture. The policy may include conditions, such as a time a gesture may be used as input.

In an embodiment, a gesture may be a particular gesture which then allows only certain users to be authorized to make gestures at certain times.

User Authentication Using XR Sensors

In an embodiment, if an authentication of the user is required, a recognition of a user fingerprint and or hand geometry can be used by a user positioning a finger of fingers in the field of view of a camera associated with the XR device, e.g., device 612. Additional factors can be a recognition of: the user's environment (e.g., a home or work office place) as the user glances around. Optionally or additionally, an authentication may include a particular gesture in response to a request from an Authenticator, or a pointing by the user to a particular object, or glancing by the user at a particular object. In an embodiment a user environment's visual appearance (e.g., the office) may be an authentication factor registered with an authentication service, which may also be a third party identity service as in a distributed identity system. In an embodiment, any of the above can be used as an additional factor in an authentication which utilizes other authentication means.

Mobile Communication Device Enhancements

Mobile communications device 612 may be used in both XR and non-XR modes. Guide 610 and its access to sensors associated with device 612, may be used to provide the following features to MCD 612, which may be beneficial during both XR and non-XR use.

In an embodiment, guide 610 may detect and prevent photos from being taken of the display of MCD 612. With access to forward facing camera 614 guide 610 may detect a camera flash and react to prevent a potential photo of display 624. The reaction may be that guide 610 causes display 624 to go change, e.g., go blank, fuzzy, white out, or display a text message prepared for such circumstances. Where MCD 612 is equipped with a rear-facing flash, the flash may be employed to flash while the potential photo is being taken. Since a flash may strobe at a faster rate than a camera, a photo of the strobe would capture both flash and then screen, which would sum to nothing in a photo. Other ways to suppress a photo may include broadcasting, using a rear-ward facing flash, an IR signal to interfere with a focus system and make display 624 badly out of focus. In an embodiment, a display may emit two or more signals which generate an image in the user's eye, but not on display 624. For example, an LED shutter-type operation in eye-glasses that display for each eye individually, may display images to left and right eyes, with the images merging only for the user.

In embodiments where an external camera was required to emit a signal that coincides with their field of view, an embodiment may detect with camera 614 that an external camera was being trained upon display 624. Such an emitted signal could be: a light (e.g., light structured or modulated or a specific frequency or combination thereof) in the visible, IR, UV, or other ranges; a sound (again structured or modulated or specific frequency or combinations thereof) in the sonic, subsonic, and supersonic ranges; and/or a digital wireless signal identifying location and orientation and field of view of camera. A responding device could send signals back in given direction to determine if a camera is actually viewing the device or device's user or surroundings and optionally instruct the external camera that it is not allowed to take that picture. The external camera may, as a result, be caused to be, e.g., disabled or the visible portion of the target display may be obscured as described above. Optionally, the instruction could permit the photo but impose conditions, e.g., a copy of photo to the user of the target camera, a copyright notice is imposed on the photo, or restrictions are placed on the subsequent use of the photo.

Mobile Device Safety while Driving or Walking

Data has shown that a significant percentage of drivers talk on their mobile phones while driving. In would be beneficial for other drivers should be aware of vehicles in which the driver is using a cell phone, so that precautions may be taken, e.g., creating additional space between vehicles.

In an embodiment, a vehicle is equipped with a visible indicator that shows the driver is using a mobile communications device (MCD), where using may include any of, e.g.: talking (hands-free or not), texting, an interacting with a map. Such an indicator may be activated by a monitor (e.g., guide 610) with access to the mobile device to the driver's text and cellular activity, e.g., via Wi-Fi, or Bluetooth, etc.). The monitor may detect the direction of the user's gaze, or input on the display, or verbal interaction with MCD voice commands. The indication may include a sign atop the vehicle with text or an icon indicating MCD use. In a policy in an embodiment, access to the vehicle may be made conditional to the monitor being allowed access to the MCD.

In an embodiment, the monitor may store metrics associated with MCD use while the vehicle is in motion. Such metrics may be accessed by others, e.g., law enforcement, insurance companies, to determine whether the user is, e.g., complying with conditions placed on the use of the vehicle, or to determine whether to impose further conditions on the user's use of the vehicle. Thus, the monitor may detect periods of cognitive distraction and point this out in a warning to the user at time of occurrence, or later; or to a custodian/guardian or administrator, e.g., an administrator of policies for employees who drive while on company business.

In an embodiment, the monitor detecting use of the MCD, the monitor may have the ability to take an action, e.g.: warning the user (e.g., using the display or speaker); modify the capabilities of the vehicle (e.g., slowing the vehicle); modifying the position of the vehicle (e.g., interacting with an auto-pilot and creating additional space between vehicle). In an embodiment, the monitor may use XR methods discussed earlier to enhance traffic-related conditions, such as the legibility of signs, the presence of sirens, etc. In an embodiment, the XR methods, guide 610 may be a part of a vehicle head's-up display that may enhance traffic-related conditions for the user's safety, as discussed earlier with regard to XR.

In an embodiment, a distance between vehicle may be adjusted as follows. If normal reaction time is NRT seconds, and distracted reaction time is ORT seconds, and normal safe following distance (measured in seconds to pass a fixed object, thus invariant of speed) is NSFD at normal speed NS (m/sec), then speed is adjusted to DS (Distracted Speed) or distance is adjusted to Distracted Safe Following Distance DSFD, so as to result in an effective safe distance between vehicles for the distracted driver that is the same as distance between vehicles in a NRT. DSFD and DS may be calculated as follows:

$$DSFD = NSFD + (DRT - NRT) \qquad \text{Eqn. 1}$$

$$DS = (NS*NRT)/ORT \qquad \text{Eqn. 2:}$$

In Equation 1, the vehicle is slowed marginally until such DSFD is achieved. In Equation 2, the strategy addresses stopping distances to objects other than a leading vehicle, e.g., a distance to an obstacle on the roadway or an object or person entering the roadway from some direction.

In an embodiment, both DSFD and DS may be adjusted. In an embodiment, adjustments can be made based on average or worst case reaction times, or based on actual measured reaction times for an individual driver. In an embodiment, the signal activated by the monitor may be visible to, or directed to, pedestrians as well.

In an embodiment, the monitor may be active while the user is not in a vehicle, but is otherwise moving, e.g., walking. The monitor may adjust its actions as appropriate for the user activity. For example, the monitor may provide a warning (a warning text or audio, or a change in screen behavior, or stop device activity) based on the monitor detecting a hazard.

In an embodiment, the monitor may function as a "good adult passenger." In such an embodiment, guide 610 may access the available MCD sensors and alert the user to detected conditions. For example, guide 610 may cause an audio comment upon camera 614 detecting a vehicle nearby, e.g., in the user's blind spot. Guide 610 may access vehicle controls and suppress distractions, e.g., music, if guide 610 detects demanding driving conditions using, e.g., the accelerometer, camera, or by monitoring traffic alerts. In an embodiment, an action by guide 610 may include the interruption of a mobile conversation. That is, guide 610 may "put the conversation on hold," perhaps with accompanying music or a pre-recorded message.

Privacy Centered Browsing

Privacy is an important issue for internet users and companies having internet-based business (e.g., search engines, websites). Some users are comfortable with having their information collected, while others are not. This creates a problem for many companies who have no way of knowing whether the user accessing their online resources resents the information being collected. This is also a problem for the users because they do not know whether the online service they are accessing collects their information and for what purpose.

In an embodiment, a solution to this issue includes an infostructure where the internet-based business may indicate the information that is collected, and/or the user may be associated with the type of information and associated purpose that the user. For example, a user may be associated with a UserPrivacy.txt file (e.g., file can be associated with a user's secure sign on (SSO), other authentication method, or kept by the user and presented to websites). When a user accesses a website or another service the UserPrivacy.txt file may be presented to the website. Thus, the website will know exactly to what data collection/uses the user consents. A similar infostructure can exist about the website (or other service)—a SitePrivacy.txt file may include the information/purpose that the site would like to collect. In some embodiments, a security component may monitor the UserPrivacy.txt, and the SitePrivacy.txt file and notify the user when there is a mismatch between the permitted collection and an actual collection of information.

Figure 7:
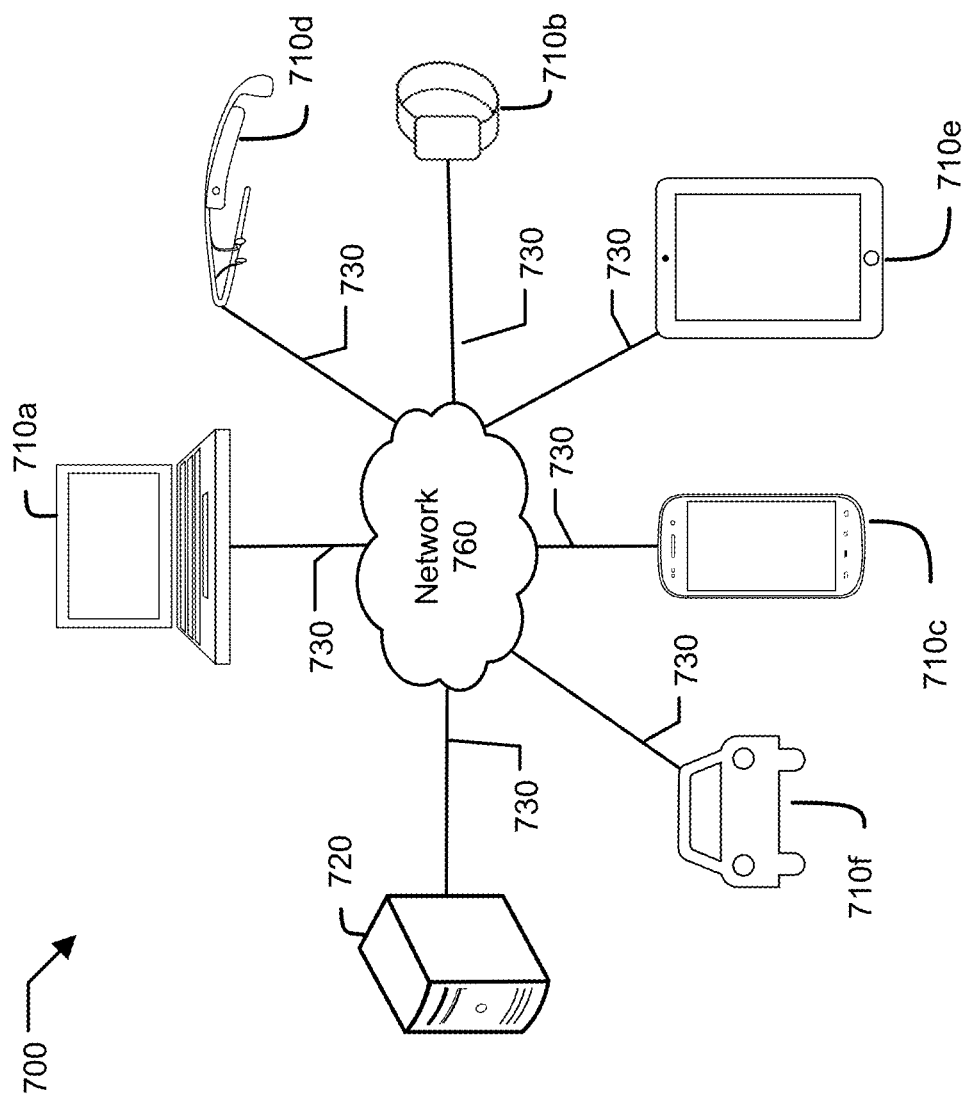
FIG. 7 is an exemplary block diagram depicting an embodiment of a system for implementing embodiments of methods of the disclosure.

FIG. 7 is an exemplary block diagram depicting an embodiment of system for implement embodiments of methods of the disclosure. In FIG. 7, computer network 700 includes a number of computing devices 710a-710f, and one or more server systems 720 coupled to a communication network 760 via a plurality of communication links 730. Communication network 760 provides a mechanism for allowing the various components of distributed network 700 to communicate and exchange information with each other.

Communication network 760 itself is comprised of one or more interconnected computer systems and communication links. Communication links 730 may include hardwire links, optical links, satellite or other wireless communications links, wave propagation links, or any other mechanisms for communication of information. Various communication protocols may be used to facilitate communication between the various systems shown in FIG. 7. These communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols, Internet telephony, IP telephony, digital voice, voice over broadband (VoBB), broadband telephony, Voice over IP (VoIP), vendor-specific protocols, customized protocols, and others. While in one embodiment, communication network 760 is the Internet, in other embodiments, communication network 760 may be any suitable communication network including a local area network (LAN), a wide area network (WAN), a wireless network, a cellular network, a personal area network (such a Bluetooth or 802.15.4, or ZigBee), an intranet, a private network, a near field communications (NFC) network, a public network, a switched network, a peer-to-peer network, and combinations of these, and the like.

In an embodiment, the server 720 is not located near a user of a computing device, and is communicated with over a network. In a different embodiment, the server 720 is a device that a user can carry upon his person, or can keep nearby. In an embodiment, the server 720 has a large battery to power long distance communications networks such as a cell network or Wi-Fi. The server 720 communicates with the other components of the personal mobile device system via wired links or via low powered short range wireless communications such as Bluetooth. In an embodiment, one of the other components of the personal mobile device system plays the role of the server, e.g., the watch 710*b*, the head mounted device or glasses or virtual reality or extended or augmented reality device 710*d*, the phone or mobile communications device 710*c*, the tablet 710*e*, the PC 710*a*, and/or the vehicle (e.g., an automobile, or other manned or unmanned or autonomous vehicle for land or aerial or aquatic operation) 710*f*. Other of the device may be, or be equipped with, extended reality devices, e.g., devices 710*c*, 710*e*, 710*b*, and 710*f* Other types of computing devices 710 include other wearable devices, devices incorporated into clothing, implantable or implanted devices, ingestible devices, or 'things' in the internet of things (IoT), which may be sensors or actuators or mobile or sessile devices, or hubs or servers controlling such 'things' or facilitating their communications.

Distributed computer network 700 in FIG. 7 is merely illustrative of an embodiment incorporating the embodiments and does not limit the scope of the invention as recited in the claims. One of ordinary skill in the art would recognize other variations, modifications, and alternatives. For example, more than one server system 720 may be connected to communication network 760. As another example, a number of computing devices 710*a*-710*f* may be coupled to communication network 760 via an access provider (not shown) or via some other server system.

Computing devices 710*a*-710*f* typically request information from a server system that provides the information. Server systems by definition typically have more computing and storage capacity than these computing devices, which are often such things as portable devices, mobile communications devices, or other computing devices that play the role of a client in a client-server operation. However, a particular computing device may act as both a client and a server depending on whether the computing device is requesting or providing information. Aspects of the embodiments may be embodied using a client-server environment or a cloud-cloud computing environment.

Server 720 is responsible for receiving information requests from computing devices 710*a*-710*f*, for performing processing required to satisfy the requests, and for forwarding the results corresponding to the requests back to the requesting computing device. The processing required to satisfy the request may be performed by server system 720 or may alternatively be delegated to other servers connected to communication network 760 or to other communications networks. A server 720 may be located near the computing devices 710 or may be remote from the computing devices 710. A server 720 may be a hub controlling a local enclave of things in an internet of things scenario.

Computing devices 710*a*-710*f* enable users to access and query information or applications stored by server system 720. Some example computing devices include portable electronic devices (e.g., mobile communications devices) such as the Apple iPhone®, the Apple iPad®, or any computing device running the Apple iOS™, Android™ OS, Google Chrome OS, Symbian OS®, Windows 10, Windows Mobile® OS, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used. In a specific embodiment, a "web browser" application executing on a computing device enables users to select, access, retrieve, or query information and/or applications stored by server system 720. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 8:
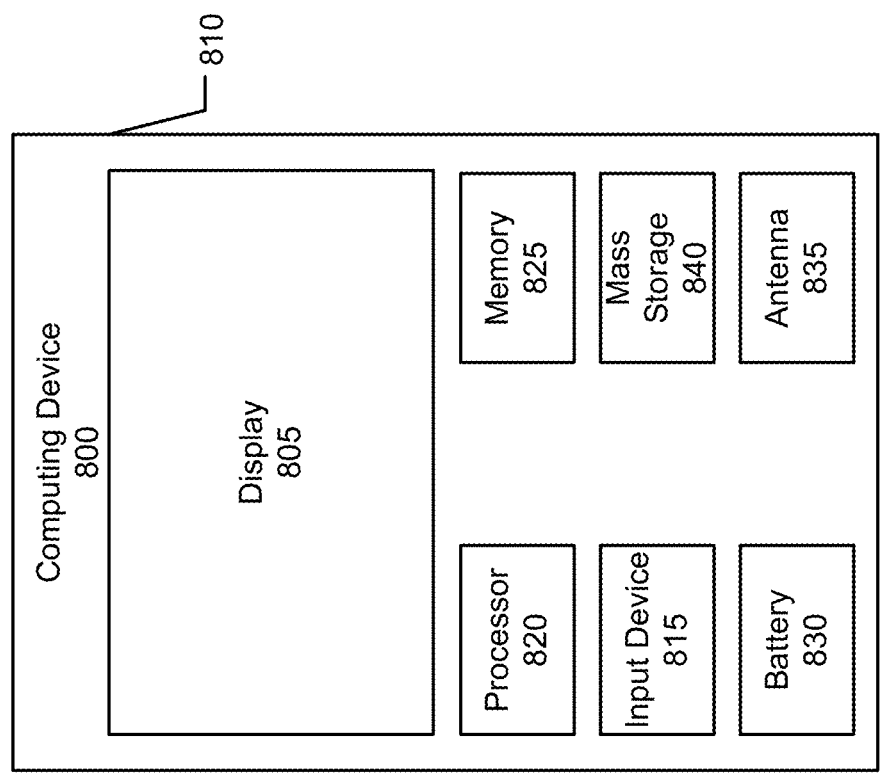
FIG. 8 is an exemplary block diagram depicting a computing device.

FIG. 8 is an exemplary block diagram depicting a computing device 800 of an embodiment. Computing device 800 may be any of the computing devices 710 from FIG. 7. Computing device 800 may include a display, screen, or monitor 805, housing 810, and input device 815. Housing 810 houses familiar computer components, some of which are not shown, such as a processor 820, memory 825, battery 830, speaker, transceiver, antenna 835, microphone, ports, jacks, connectors, camera, input/output (I/O) controller, display adapter, network interface, mass storage devices 840, various sensors, and the like.

Input device 815 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 840 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, SD cards, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 8 is but an example of a computer system suitable for use with the embodiments. Other configurations of subsystems suitable for use with the embodiments will be readily apparent to one of ordinary skill in the art. For example, in a specific implementation, the computing device is a mobile communications device such as a smartphone or tablet computer. Some specific examples of smartphones include the Droid Incredible and Google *Nexus* One, provided by HTC Corporation, the iPhone or iPad, both provided by Apple, and many others. The computing device may be a laptop or a netbook. In another specific implementation, the computing device is a non-portable computing device such as a desktop computer or workstation.

A computer-implemented or computer-executable version of the program instructions useful to practice the embodiments may be embodied using, stored on, or associated with computer-readable medium. A computer-readable medium may include any medium that participates in providing instructions to one or more processors for execution, such as memory 825 or mass storage 840. Such a medium may take many forms including, but not limited to, nonvolatile, volatile, transmission, non-printed, and printed media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice the embodiments may be stored or reside in RAM or cache memory, or on mass storage device 840. The source code of this software may also be stored or reside on mass storage device 840 (e.g., flash drive, hard disk, magnetic disk, tape, or CD-ROM). As a further example, code useful for practicing the embodiments may be transmitted via wires, radio waves, or through a network such as the Internet. In another specific embodiment, a computer program product including a variety of software program code to implement features of the embodiment (e.g., embodiments of guide 610) is provided. In the embodiment, the computer program product may include multiple software modules that cooperate to implement features of the embodiment. In the embodiment, the multiple software modules may be distributed among one or more of networked computing devices 720 and 710*a*-710*f*.

Computer software products may be written in any of various suitable programming languages, such as C, C++, C #, Pascal, Fortran, Perl, Matlab (from MathWorks, www.mathworks.com), SAS, SPSS, JavaScript, CoffeeScript, Objective-C, Swift, Objective-J, Ruby, Python, Erlang, Lisp, Scala, Clojure, Java, Rust, Go, R, Kotlin, PHP, ECMAScript, WebAssembly. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, Bada, MeeGo, Maemo, Limo, or Brew OS. Other examples of operating systems include one of the Microsoft Windows family of operating systems (e.g., Windows 10 or other Windows versions, Windows CE, Windows Mobile, Windows Phone, Windows 10 Mobile), Linux, HP-UX, UNIX, Sun OS, Solaris, Mac OS X, Alpha OS, AIX, or any of various operating systems used for Internet of Things (IoT) devices or automotive or other vehicles or Real Time Operating Systems (RTOS), such as the RIOT OS, Windows 10 for IoT, WindRiver VxWorks, ARM Mbed OS, Embedded Apple iOS and OS X, the Nucleus RTOS, Green Hills Integrity, or Contiki, or any of various Programmable Logic Controller (PLC) or Programmable Automation Controller (PAC) operating systems such as Microware OS-9, VxWorks, QNX Neutrino, FreeRTOS, Micrium μC/OS-II, Micrium μC/OS-III, Windows CE, TI-RTOS, RTEMS. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing the embodiments using a wireless network employing a protocol such as Wi-Fi (IEEE standards 802.11, 802.11a, 802.11b, 802.11e, 802.11g, 802.11i, and 802.11n, just to name a few examples), or other protocols, such as BLUETOOTH or NFC or 802.15 or cellular, or communication protocols may include TCP/IP, UDP, HTTP protocols, wireless application protocol (WAP), BLUETOOTH, Zigbee, 802.11, 802.15, 6LoWPAN, LiFi, Google Weave, NFC, GSM, CDMA, other cellular data communication protocols, wireless telephony protocols or the like. For example, signals from a computer may be transferred, at least in part, wirelessly to components or other computers.

In an embodiment, a method comprises: monitoring, by a software component executing on a network-enabled client device, communications relayed by the client device; comparing, by the software component, the monitored communications to a policy; determining, by the software component based on the comparison, that the monitored communications violate the policy; causing, by the software component, the client device to stop relaying communications. In an embodiment, the determination that the monitored communications violate the policy includes: determining that the policy does not allow relaying communications; determining that the client device is in a location in which the policy does not allow relaying communications; determining that a battery level of the client device is below a first threshold level provided by the policy; determining, based on the location and the battery level that the client device is below a second threshold battery level, the second threshold battery level based on an estimated time until the client device may be recharged; or determining that a ratio of communications relayed by the client device to communications relayed for the network-enabled client device exceeds a predetermined ratio. In an embodiment, the client device is a mobile communications device.

While the embodiments have been described with regards to particular embodiments, it is recognized that additional variations may be devised without departing from the inventive concept.

The terminology used herein is for the purpose of describing particular embodiments only and is not intended to be limiting of the claimed subject matter. As used herein, the term "and/or" includes any and all combinations of one or more of the associated listed items. As used herein, the singular forms "a," "an," and "the" are intended to include the plural forms as well as the singular forms, unless the context clearly indicates otherwise. It will further be understood that the terms "comprises" and/or "comprising," when used in this specification, specify the presence of states features, steps, operations, elements, and/or components, but do not preclude the present or addition of one or more other features, steps, operations, elements, components, and/or groups thereof.

Unless otherwise defined, all terms (including technical and scientific terms) used herein have the same meaning as commonly understood by one having ordinary skill in the art to which the embodiments belong. It will further be understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the embodiments, it will be understood that a number of elements, techniques, and steps are disclosed. Each of these has individual benefit and each can also be used in conjunction with one or more, or in some cases all, of the other disclosed elements, or techniques. The specification and claims should be read with the understanding that such combinations are entirely within the scope of the embodiments and the claimed subject matter.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

What is claimed is:

1. A system comprising at least one processor and memory with instructions that when executed by the at least one processor cause the system to perform actions including:
receiving, by a software component executing on the system, image data from one or more cameras, the image data comprising real-world image data and hidden image data, the real-world data being displayed on a display of the system and hidden image data not being displayed on the display;
receiving, by the software component, extended reality (XR) images to be displayed on the display in addition to the displayed real-world image data;
monitoring, by a guide software component, the real-world image data;
detecting, by the guide software component, a real-world element from the real-world image data; and
modifying, by the guide software component, the XR images in response to detecting the real-world element to emphasize the real-world element in the displayed real-world image data and deemphasize previously-displayed XR images.

2. The system of claim 1, the displayed real-world image data comprising informative content, monitoring the real-world image data comprising detecting, by the guide software component, the informative content, the informative content comprising one of a quick response (QR) code, a face recognized using facial recognition, or a text sign identified using optical character recognition, the instructions further causing the system to perform actions including:
retrieving, by the guide software component from a database in communication with the system, information regarding the informative content in response to the detecting the informative content;
applying rules for the display of content to the information regarding the informative content; and
displaying the informative content on the display when the informative content satisfies the rules for the display of content.

3. The system of claim 1, the XR images being displayed on the display based on policies enforced by the guide software component, the instructions further causing the system to perform actions including:
determining differences, by the guide software component, between the XR images and the displayed real-world image data; and
comparing the determined differences to the policies, the XR images being modified prior to display based on at least one of the policies being applicable.

4. The system of claim 3, the policies including a rule that the presentation of safety-related images in the displayed real-world image data be prioritized over the XR images.

5. The system of claim 4, the prioritizing resulting in the display of a safety notification on the display associated with detected safety-related real-world images.

6. The system of claim 4, the prioritizing resulting in enhancing detected safety-related real-world images within the displayed image data to be more visible than XR images.

7. The system of claim 4, the prioritizing resulting in defining geolocations which, when displayed in the real-world image data, may not be overwritten by XR images.

8. The system of claim 3, the policies including a rule where detecting the real world element triggers a modification to the XR images, the real-world element being one of a safety notification, a hazard, or a moving element that is on a trajectory to impact the system.

9. The system of claim 3, the policies including a rule where detecting an event external to the real-world image data triggers a modification to the XR images, the event external to the real-world image data being one of a current user state, an event detected by a sensor of the system, and an event received as a message across a network connection.

10. The system of claim 3, the policies including a rule that triggers a modification to the XR images based on preferences of a user, the preferences of the user being one of compensating for an indicated disability, comporting with a selected theme, providing a list of customized triggering events, and providing a list of customized triggering locations.

11. A system comprising at least one processor and memory with instructions that when executed by the at least one processor cause the system to perform actions including:
receiving, by a software component of the system, image data from one or more cameras, the image data comprising real-world image data and hidden image data, the real-world data being displayed on a display of the system and hidden image data not being displayed on the display;
receiving, by the software component, extended reality (XR) images to be displayed on the display in addition to the displayed real-world image data;
monitoring, by a guide software component, the real-world image data;
detecting, by the guide software component, a real-world element from the real-world image data;
providing, by the guide software component, one of a haptic event and an audio event executed by the system in response to the detecting the real-world element from the real-world image data and,
modifying, by the guide software component, the XR images in response to detecting the real-world element to emphasize the real-world element in the displayed real-world image data and deemphasize previously-displayed XR images in addition to the providing of the one of the haptic event and the audio event.

12. The system of claim 11, the software component being executed on a network accessible to the system.

13. The system of claim 11, the software component being executed on the system.

14. The system of claim 11, the audio event comprising one of turning off virtual audio or turning off noise cancellation in response to detecting the real-world element.

15. A system comprising at least one processor and memory with instructions that when executed by the at least one processor cause the system to perform actions including:
receiving, by a guide software component executing on the system, image data from one or more cameras, the image data comprising real-world image data and hidden image data, the real-world data being displayed on a display of the system and hidden image data not being displayed on the display;
detecting, by the guide software component, a real-world element from the real-world image data;
detecting, by the guide software component, a source of extended reality (XR) images to be displayed on the display in addition to the displayed real-world image data;
causing, by the guide software component, a connection to be created between the system and a device hosting the source of XR images;
acquiring, by the guide software component, the XR images from the device hosting the source;
causing, by the guide software component, the acquired XR images to be displayed on the display in addition to the displayed real-world image data; and
modifying, by the guide software component, the XR images in response to detecting the real-world element to emphasize the real-world element in the displayed real-world image data and deemphasize previously-displayed XR images.

16. The system of claim 15, the instructions further causing the system to perform actions including: determining, by the guide software component, if the source has a stored trust level greater than a predetermined threshold, the acquired XR images being displayed in an unmodified state only when the stored trust level is greater than the predetermined threshold.

17. The system of claim 16, the instructions further causing the system to perform actions including: modifying prior to display, by the guide software component, the acquired XR images in response to the stored trust level being lower than the predetermined threshold, the modifying comprising removing detail from the acquired XR images.

18. The system of claim 16, the instructions further causing the system to perform actions including: causing, by the guide software component, an alternate source of the XR images to be provided via a displayed notification in response to the stored trust level being lower than the predetermined threshold.

19. The system of claim 15, the instructions further causing the system to perform actions including: receiving, by the guide software component, an electronically-signed assertion of trust from the device hosting the source and authenticating the assertion of trust prior to the causing the connection to be created.

20. A non-transitory computer-readable medium comprising instructions that when executed by a processor of a network-enabled client device cause the network-enabled client device to perform actions including:
receiving, by a software component executing on the network-enabled client device, image data from one or more cameras, the image data comprising real-world image data and hidden image data, the real-world data being displayed on a display of the network-enabled client device and hidden image data not being displayed on the display;
receiving, by the software component, extended reality (XR) images to be displayed on the display in addition to the displayed real-world image data;
monitoring, by a guide software component, the real-world image data;
detecting, by the guide software component, a real-world element from the real-world image data; and
modifying, by the guide software component, the XR images in response to detecting the real-world element to emphasize the real-world element in the displayed real-world image data and deemphasize previously-displayed XR images.

21. The non-transitory computer-readable medium of claim 20, the displayed real-world image data comprising informative content, monitoring the real-world image data comprising detecting, by the guide software component, the informative content, the informative content comprising one of a quick response (QR) code, a face recognized using facial recognition, or a text sign identified using optical character recognition, the instructions further causing the client device to perform actions including:
retrieving, by the guide software component from a database in communication with the client device, information regarding the informative content in response to the detecting the informative content;
applying rules for the display of content to the information regarding the informative content; and
displaying the informative content on the display when the informative content satisfies the rules for the display of content.

22. The non-transitory computer-readable medium of claim 20, the XR images being displayed on the display based on policies enforced by the guide software component, the instructions further causing the client device to perform actions including:
  determining differences, by the guide software component, between the XR images and the displayed real-world image data; and
  comparing the determined differences to the policies, the XR images being modified prior to display based on at least one of the policies being applicable.

23. The non-transitory computer-readable medium of claim 22, the policies including a rule that the presentation of safety-related images in the displayed real-world image data be prioritized over the XR images.

24. The non-transitory computer-readable medium of claim 23, the prioritizing resulting in the display of a safety notification on the display associated with detected safety-related real-world images.

25. The non-transitory computer-readable medium of claim 23, the prioritizing resulting in enhancing detected safety-related real-world images within the displayed image data to be more visible than XR images.

26. The non-transitory computer-readable medium of claim 23, the prioritizing resulting in defining geolocations which, when displayed in the real-world image data, may not be overwritten by XR images.

27. The non-transitory computer-readable medium of claim 22, the policies including a rule where detecting the real world element triggers a modification to the XR images, the real-world element being one of a safety notification, a hazard, or a moving element that is on a trajectory to impact the client device.

28. The non-transitory computer-readable medium of claim 22, the policies including a rule where detecting an event external to the real-world image data triggers a modification to the XR images, the event external to the real-world image data being one of a current user state, an event detected by a sensor of the client device, and an event received as a message across a network connection.

29. The non-transitory computer-readable medium of claim 22, the policies including a rule that triggers a modification to the XR images based on preferences of a user, the preferences of the user being one of compensating for an indicated disability, comporting with a selected theme, providing a list of customized triggering events, and providing a list of customized triggering locations.

30. A non-transitory computer-readable medium comprising instructions that when executed by a processor of a network-enabled client device cause the network-enabled client device to perform actions including:
  receiving, by a software component of the network-enabled client device, image data from one or more cameras, the image data comprising real-world image data and hidden image data, the real-world data being displayed on a display of the client device and hidden image data not being displayed on the display;
  receiving, by the software component, extended reality (XR) images to be displayed on the display in addition to the displayed real-world image data;
  monitoring, by a guide software component, the real-world image data;
  detecting, by the guide software component, a real-world element from the real-world image data;
  providing, by the guide software component, one of a haptic event and an audio event executed by the network-enabled client device in response to the detecting the real-world element from the real-world image data; and
  modifying, by the guide software component, the XR images in response to detecting the real-world element to emphasize the real-world element in the displayed real-world image data and deemphasize previously-displayed XR images in addition to the providing of the one of the haptic event and the audio event.

31. The non-transitory computer-readable medium of claim 30, the software component being executed on a network accessible to the network-enabled client device.

32. The non-transitory computer-readable medium of claim 30, the software component being executed on the network-enabled client device.

33. The non-transitory computer-readable medium of claim 30, the audio event comprising one of turning off virtual audio or turning off noise cancellation in response to detecting the real-world element.

34. A non-transitory computer-readable medium comprising instructions that when executed by a processor of a network-enabled client device cause the network-enabled client device to perform actions including:
  receiving, by a guide software component executing on the network-enabled client device, image data from one or more cameras, the image data comprising real-world image data and hidden image data, the real-world data being displayed on a display of the client device and hidden image data not being displayed on the display;
  detecting, by the guide software component, a real-world element from the real-world image data;
  detecting, by the guide software component, a source of extended reality (XR) images to be displayed on the display in addition to the displayed real-world image data;
  causing, by the guide software component, a connection to be created between the network-enabled client device and a device hosting the source of XR images;
  acquiring, by the guide software component, the XR images from the device hosting the source;
  causing, by the guide software component, the acquired XR images to be displayed on the display in addition to the displayed real-world image data; and
  modifying, by the guide software component, the XR images in response to detecting the real-world element to emphasize the real-world element in the displayed real-world image data and deemphasize previously-displayed XR images.

35. The non-transitory computer-readable medium of claim 34, the instructions further causing the network-enabled client device to perform actions including: determining, by the guide software component, if the source has a stored trust level greater than a predetermined threshold, the acquired XR images being displayed in an unmodified state only when the stored trust level is greater than the predetermined threshold.

36. The non-transitory computer-readable medium of claim 35, the instructions further causing the network-enabled client device to perform actions including: modifying prior to display, by the guide software component, the acquired XR images in response to the stored trust level being lower than the predetermined threshold, the modifying comprising removing detail from the acquired XR images.

37. The non-transitory computer-readable medium of claim 35, the instructions further causing the network-enabled client device to perform actions including: causing, by the guide software component, an alternate source of the XR images to be provided via a displayed notification in response to the stored trust level being lower than the predetermined threshold.

38. The non-transitory computer-readable medium of claim 34, the instructions further causing the network-enabled client device to perform actions including: receiving, by the guide software component, an electronically-signed assertion of trust from the device hosting the source and authenticating the assertion of trust prior to the causing the connection to be created.

\* \* \* \* \*